United States Patent
Bier et al.

(12)

(10) Patent No.: US 10,211,611 B2
(45) Date of Patent: Feb. 19, 2019

(54) SUPPORT CORE WITH A SECURING AND RELEASING MECHANISM

(71) Applicant: Richards Manufacturing Company, a New Jersey Limited Partnership, Irvington, NJ (US)

(72) Inventors: Bruce Bier, Warren, NJ (US); Christopher A. Juillet, Basking Ridge, NJ (US); Jeff Madden, Bernardsville, NJ (US)

(73) Assignee: Richards Manufacturing Company, a New Jersey Limited Partnership, Irvington, NJ (US)

( * ) Notice: Subject to any disclaimer, the term of this patent is extended or adjusted under 35 U.S.C. 154(b) by 0 days.

(21) Appl. No.: 15/825,725

(22) Filed: Nov. 29, 2017

(65) Prior Publication Data

US 2018/0166869 A1    Jun. 14, 2018

Related U.S. Application Data

(60) Provisional application No. 62/432,162, filed on Dec. 9, 2016, provisional application No. 62/456,377, filed on Feb. 8, 2017.

(51) Int. Cl.
| | | |
|---|---|---|
| B26B 27/00 | (2006.01) |
| B26F 3/02 | (2006.01) |
| H02G 1/14 | (2006.01) |
| H02G 3/04 | (2006.01) |
| H02G 15/04 | (2006.01) |
| H02G 15/18 | (2006.01) |

(52) U.S. Cl.
CPC .......... *H02G 3/0462* (2013.01); *B26B 27/00* (2013.01); *B26F 3/02* (2013.01); *H02G 1/14* (2013.01); *H02G 15/1826* (2013.01); *H02G 15/046* (2013.01); *Y10T 29/49821* (2015.01)

(58) Field of Classification Search
CPC ........ H02G 1/14; H02G 1/046; H02G 3/0462; H02G 15/18265; B26F 3/02; B26B 27/00; Y10T 29/49821
USPC ............. 174/73.1, 21 R; 29/283.5, 432, 523; 285/382.2, 382.4, 222; 604/153; 165/173
See application file for complete search history.

(56) References Cited

U.S. PATENT DOCUMENTS

| | | | |
|---|---|---|---|
| 6,309,721 B1 * | 10/2001 | Gladfelter | ............... B60R 13/08 428/298.1 |
| 2007/0275194 A1 * | 11/2007 | Suzuki | ............... H02G 15/1826 428/34.9 |

FOREIGN PATENT DOCUMENTS

CA    2652684 A1 *    8/2010    ............... H02G 1/16

OTHER PUBLICATIONS

CA 2652684 Francois et al. Assembly to Close Interiorly a Long Element; EPO English Machine Translation, Nov. 13, 2018, pp. 1-5.*

* cited by examiner

*Primary Examiner* — Bayan Salone
(74) *Attorney, Agent, or Firm* — Stroock & Stroock & Lavan LLP

(57) ABSTRACT

A support core includes a tube body for holding a device in an expanded state, a low-friction film disposed over an outer surface of the tube body, and a fixing device for holding the film in place, the fixing device comprising a loop of tape wrapped longitudinally over the film and through the tube body, or a tab on the film that is affixed to the tube body. To remove the tube body, the tape and/or film are cut so that the film can slide towards the front end of the tube body, and the tube body is then pulled out of the device.

20 Claims, 25 Drawing Sheets

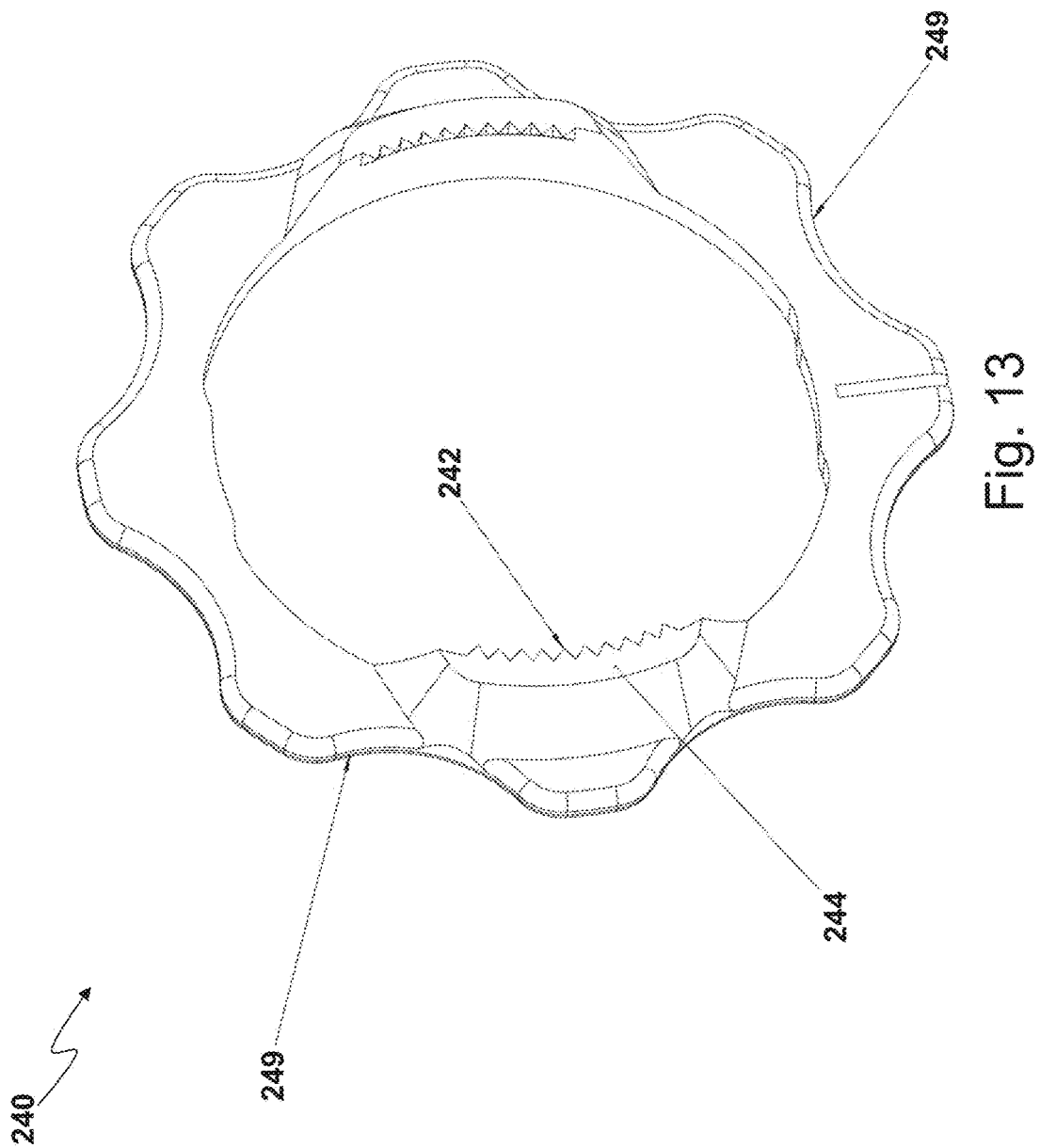

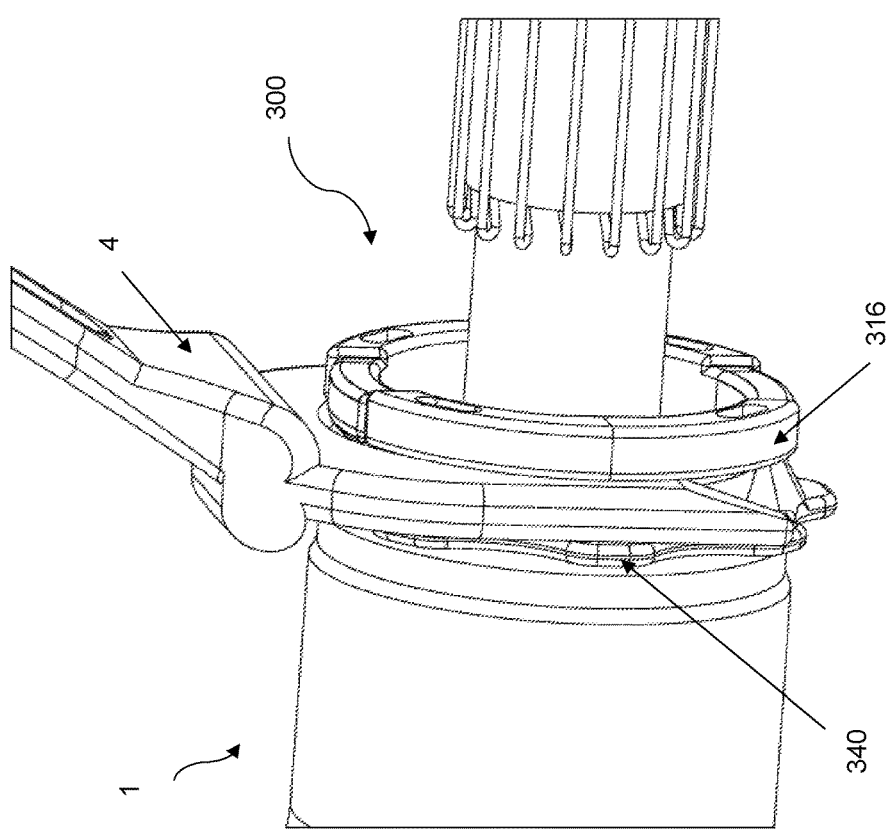

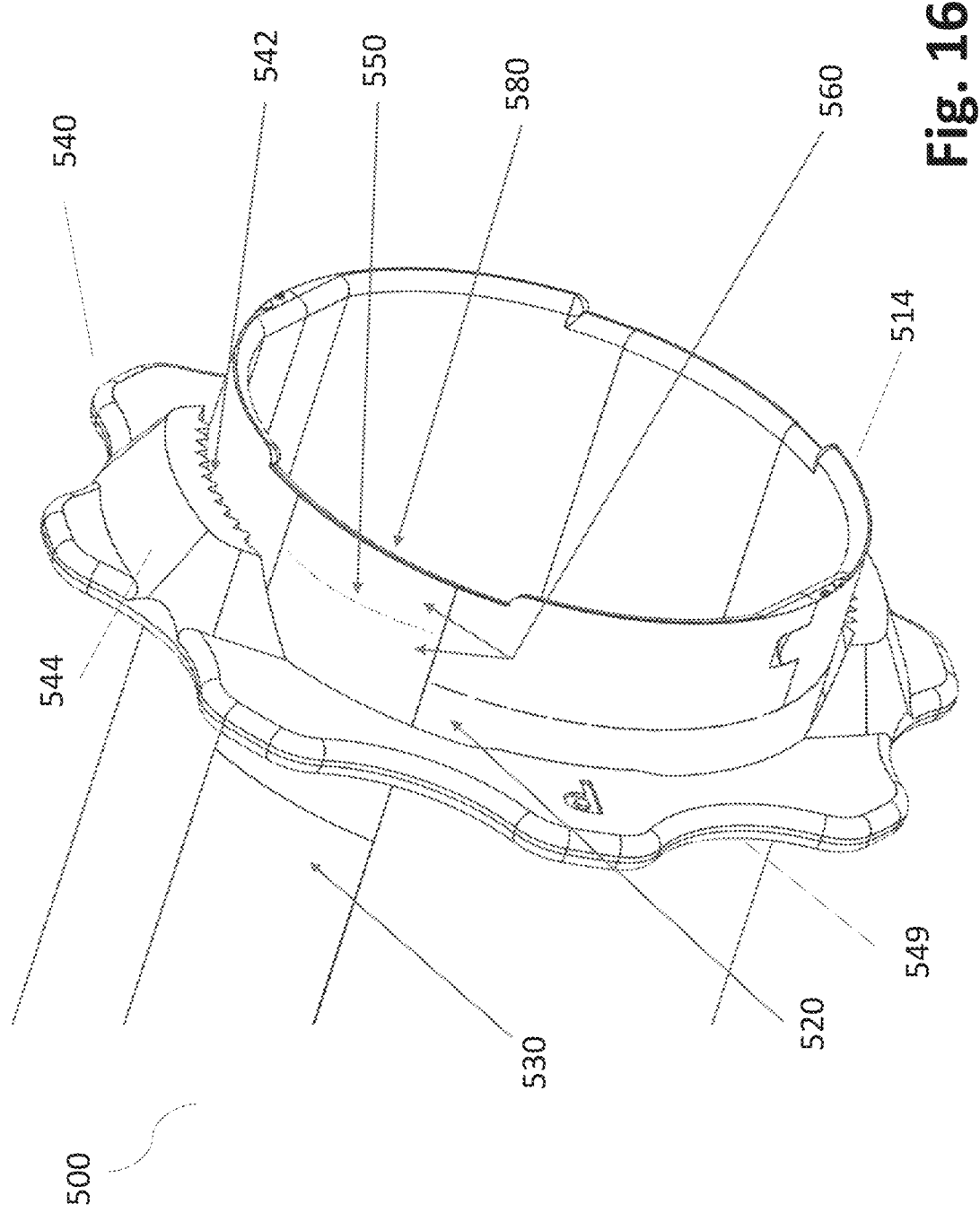

SUPPORT CORE WITH A SECURING AND RELEASING MECHANISM

RELATED APPLICATIONS

This application claims the benefit of U.S. Provisional Application No. 62/432,162, filed Dec. 9, 2016, and U.S. Provisional Application No. 62/456,377, filed Feb. 8, 2017, both of which are incorporated herein by reference in their entirety.

BACKGROUND

Support cores are typically tubular supports that hold the elastic end of a device in an expanded state. For example, in the context of electrical power distribution systems, support cores are often used to hold open the end of a cable terminating device. For example, an elastic end of a splice or termination, which is designed to be disposed over the top of a terminated power cable to properly insulate and shield electrical stresses within the connection, may be held open by the support core. Removal of the support core causes the elastic end to bear down upon the end of the cable. Of course, support cores can be used in other contexts as well.

SUMMARY

The present invention generally relates to support cores used in connection with, for example, cold shrinkable materials. More specifically, various embodiments relate to support cores and related methods that include a securing and releasing mechanism for keeping the support core in position within a device.

In some embodiments, the invention provides a support core comprising a tube body comprising an outer surface and an inner surface, the tube body configured to hold an elastic end of a device in an expanded state; a film disposed over at least a portion of the outer surface of the tube body, the film configured to slide over the at least a portion of the outer surface of the tube body; and a fixing device configured to prevent the film from sliding towards a front end region of the tube body, the fixing device comprising a tape wrapped longitudinally over the film and through the tube body, at least one portion of the tape secured to another portion of the tape to form a loop.

In some embodiments, the support core further comprises a cutting device configured to cut the fixing device.

In some embodiments, a back end region of the tube body comprises a flange extending from and over the outer surface of the tube body, and the tape forms a ramp where it passes over the flange.

In some embodiments, the flange extends around a complete circumference of the tube body.

In some embodiments, the tape comprises an adhesive tape adhered to a top surface of the film and the inner surface of the tube body.

In some embodiments, at least one portion of the tape is welded to the film or the tube body.

In some embodiments, the cutting device comprises a ring slidable longitudinally along the outside surface of the tube body, the ring comprising a cutting surface.

In some embodiments, the cutting surface comprises one or more teeth.

In some embodiments, the cutting surface comprises a knife edge.

In some embodiments, the ring comprises a radial surface and a longitudinal offset boss, wherein the cutting surface is disposed on an internal surface of the longitudinal offset boss.

In some embodiments, the radial surface comprises one or more finger grips.

In some embodiments, the film is further disposed over at least a portion of the inner surface of the tube body and attached to the inner surface.

In some embodiments, the inner surface of the tube body comprises at least one protrusion, and the film comprises at least one opening engaged with the protrusion.

In some embodiments, the support core further comprises a locking mechanism engaged with the film to prevent the at least one opening of the film from disengaging from the at least one protrusion.

In some embodiments, the locking mechanism comprises a locking ring disposed inside the tube body, the film sandwiched between the inner surface of the tube body and the locking ring.

In some embodiments, the invention provides a method for deploying a support core, in which at least a portion of the support core is disposed in a device to keep at least a portion of the device in an expanded state. The support core can be a support core as described above. The method comprises cutting or breaking the fixing device so that the film can slide towards the front end of the tube body, and then utilizing the flange to pull the tube body out of the device.

In some embodiments, the back end region comprises a flange disposed on the outer surface of the tube body, and the method further comprises utilizing the flange to pull the tube body out of the device.

In some embodiments, the invention provides a support core comprising a tube body comprising an outer surface and an inner surface, the tube body configured to hold an elastic end of a device in an expanded state, a film disposed over at least a portion of the outer surface of the tube body, the film configured to slide over a portion of the outer surface of the tube body, and a fixing device configured to prevent the film from sliding towards a front end region of the tube body, the fixing device comprising a tab region integral to the film, the tab region including a bonding region where the tab region is secured to a back end region of the tube body.

In some embodiments, the support core further comprises a cutting device configured to cut the tab region.

In some embodiments, the film is further disposed over at least a portion of the inner surface of the tube body and attached to the inner surface.

BRIEF DESCRIPTION OF THE DRAWINGS

The various aspects and embodiments disclosed herein will be better understood when read in conjunction with the appended drawings, wherein like reference numerals refer to like components. For the purposes of illustrating aspects of the present application, there are shown in the drawings certain preferred embodiments. It should be understood, however, that the application is not limited to the precise arrangement, structures, features, embodiments, aspects, and devices shown, and the arrangements, structures, features, embodiments, aspects and devices shown may be used singularly or in combination with other arrangements, structures, features, embodiments, aspects and devices. The drawings are not necessarily drawn to scale and are not in any way intended to limit the scope of this invention, but are merely presented to clarify illustrated embodiments of the invention. In these drawings:

FIG. 13 is a perspective view of the cutting device depicted in FIG. 9;

FIGS. 14A-14G illustrate core removal according to an embodiment of the invention;

FIG. 16 is a perspective view of a flangeless support core, according to an embodiment of the invention.

DETAILED DESCRIPTION OF THE PREFERRED EMBODIMENTS

Figure 1:
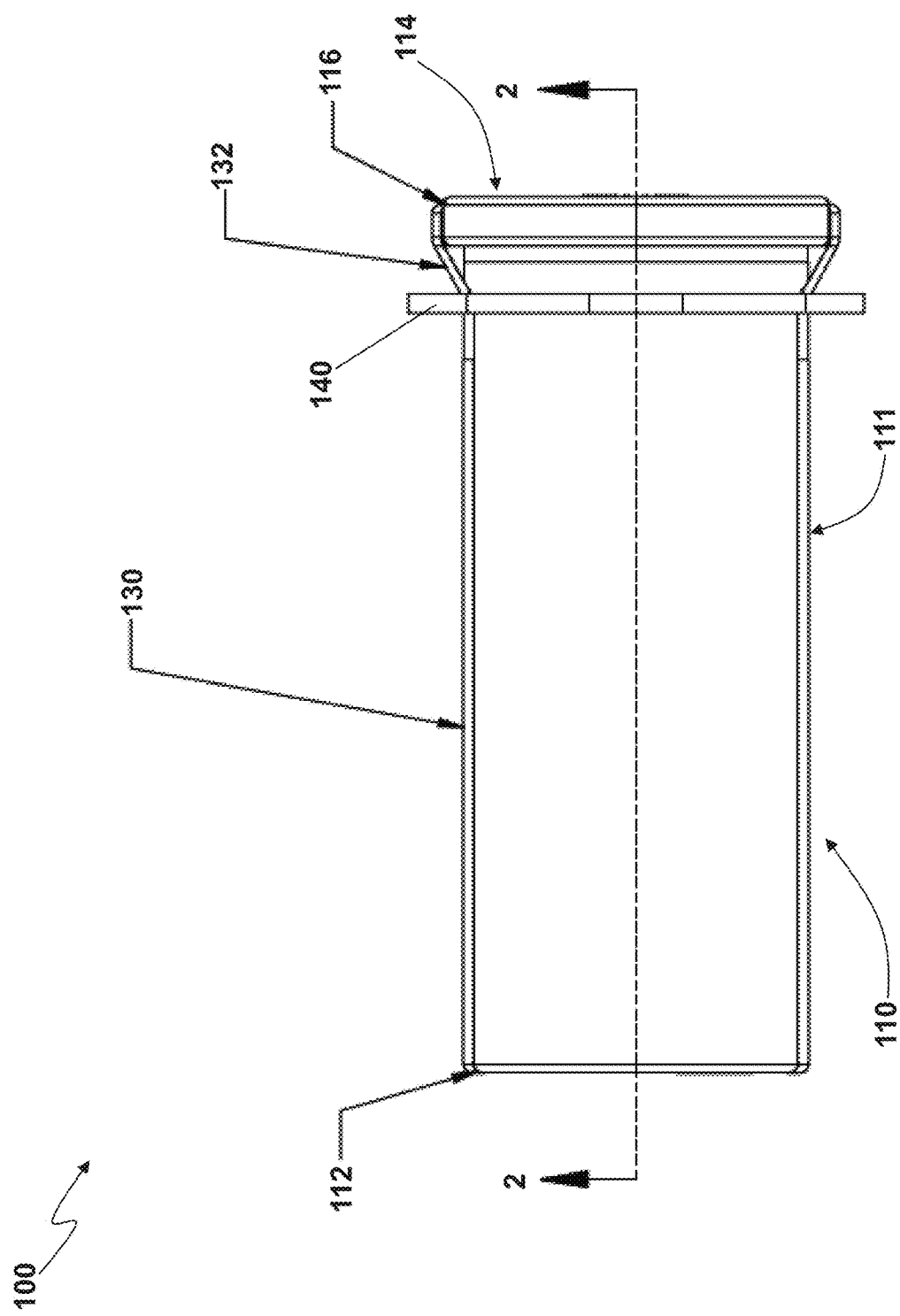
FIG. 1 is a side view of a support core according to an embodiment of the invention.
Figure 2:
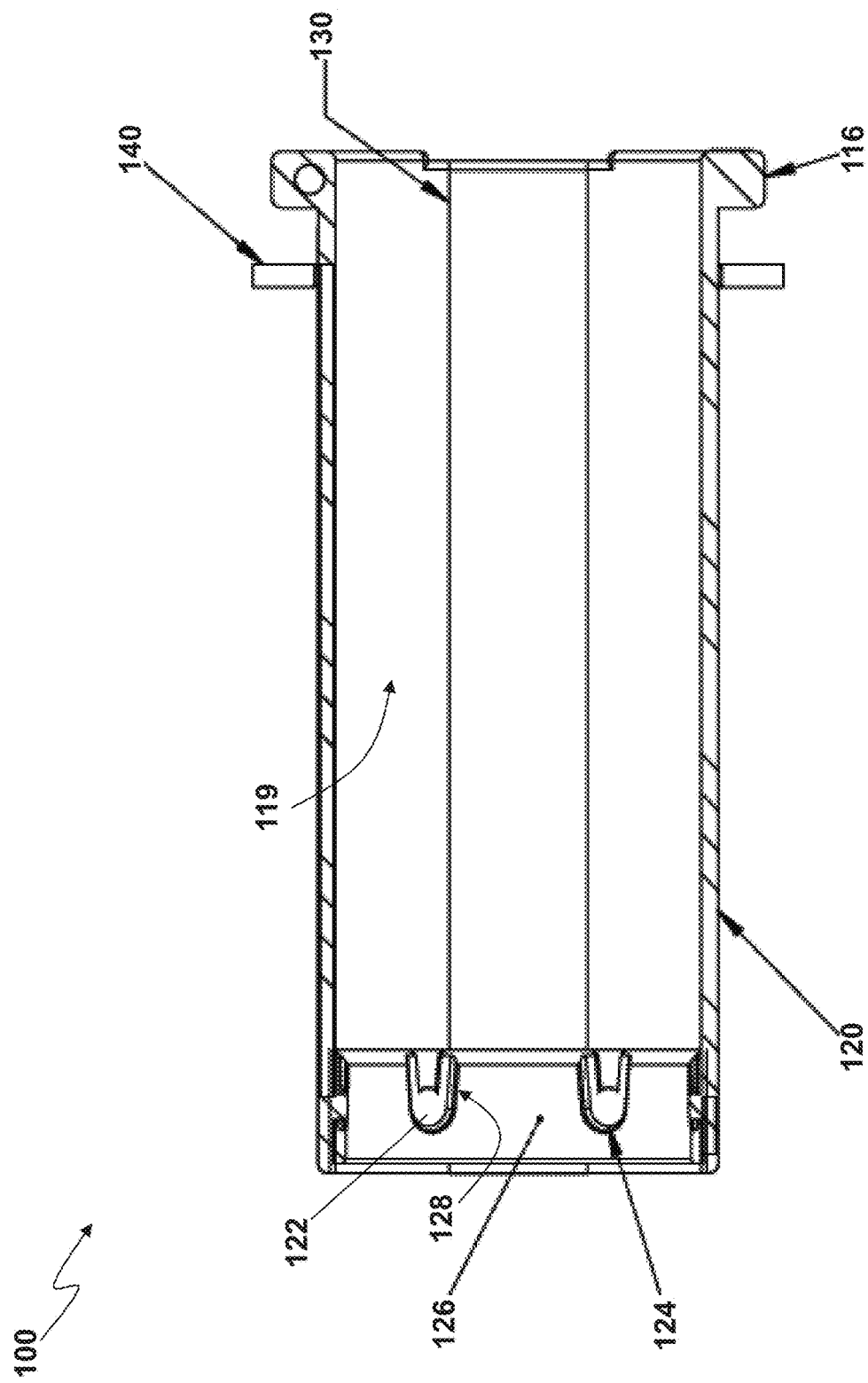
FIG. 2 is a cross-sectional view along line 2-2 in FIG. 1.
Figure 3:
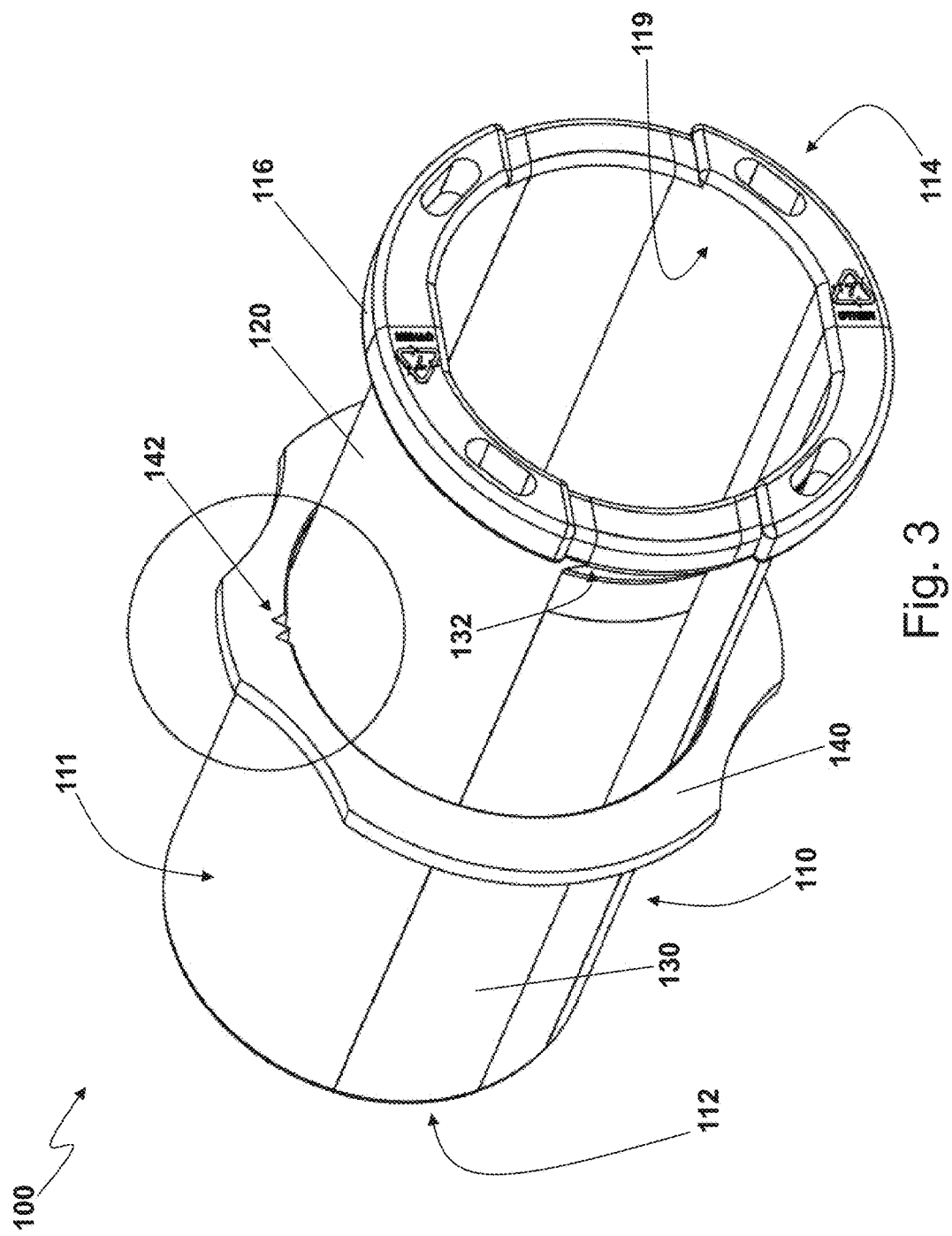
FIG. 3 is a perspective view of the support core of FIG. 1.
Figure 4:
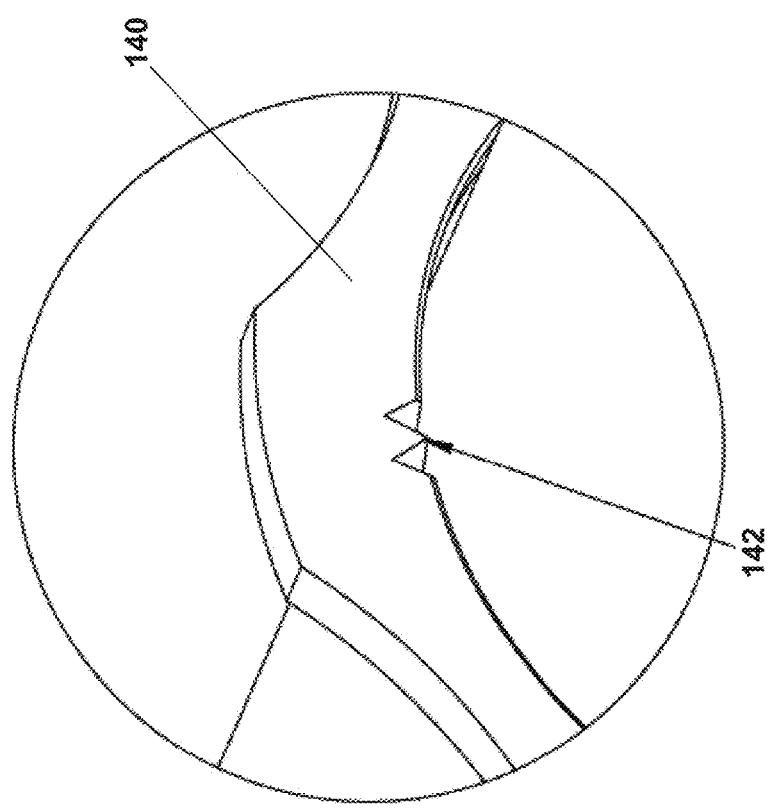
FIG. 4 is a detailed perspective view of the cutting surface on the cutting device depicted in FIG. 3.
Figure 5:
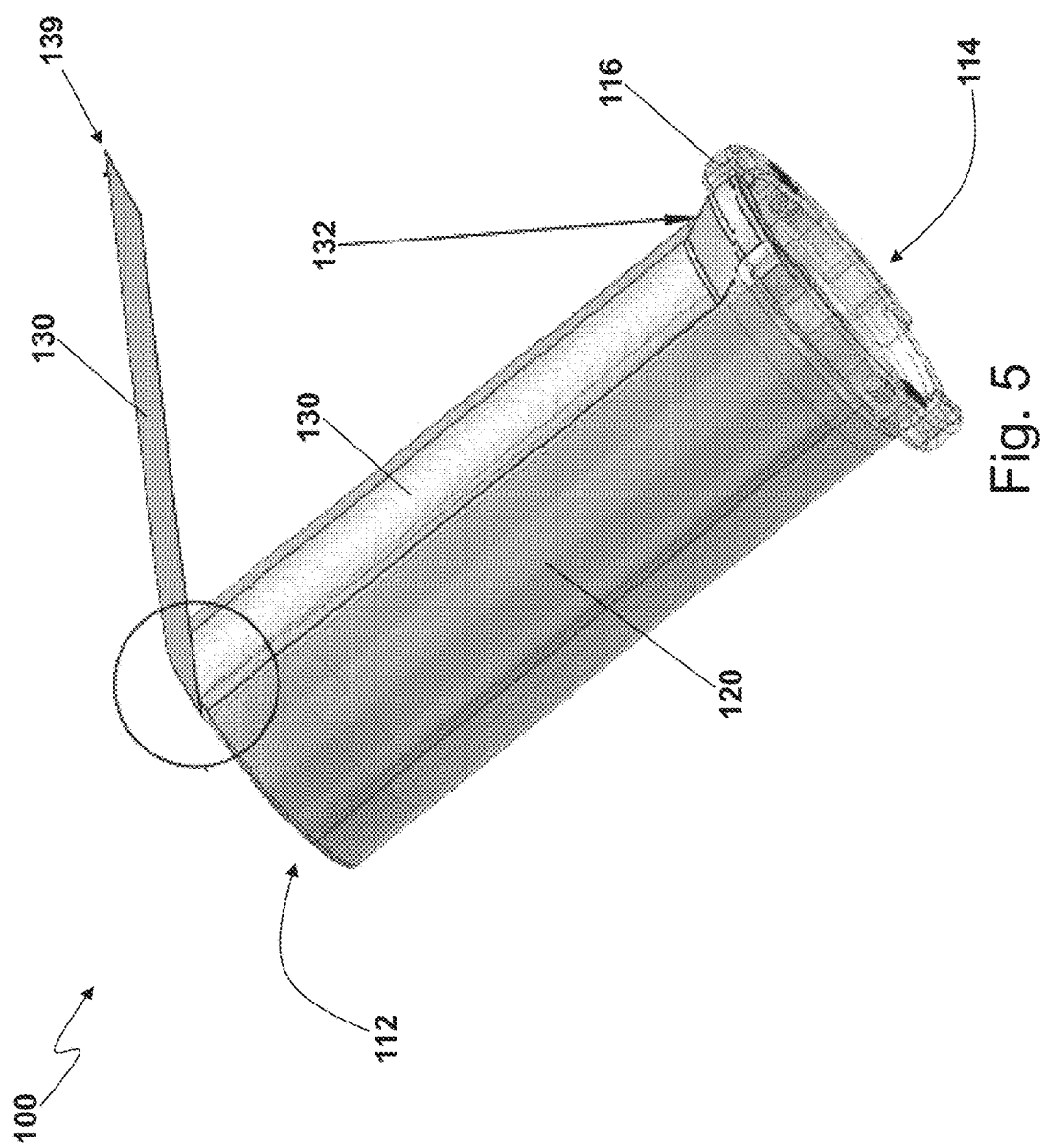
FIG. 5 is a perspective view illustrating the assembly of the fixing device depicted in FIG. 1.
Figure 6:
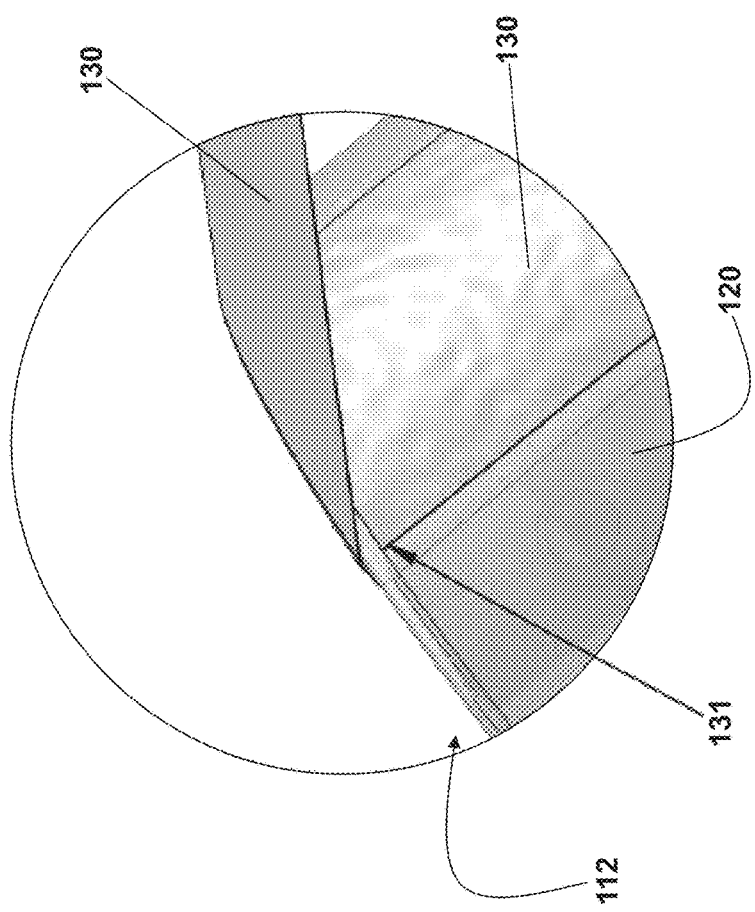
FIG. 6 is a detailed perspective view illustrating the assembly of the fixing device depicted in FIG. 5.
Figure 7:
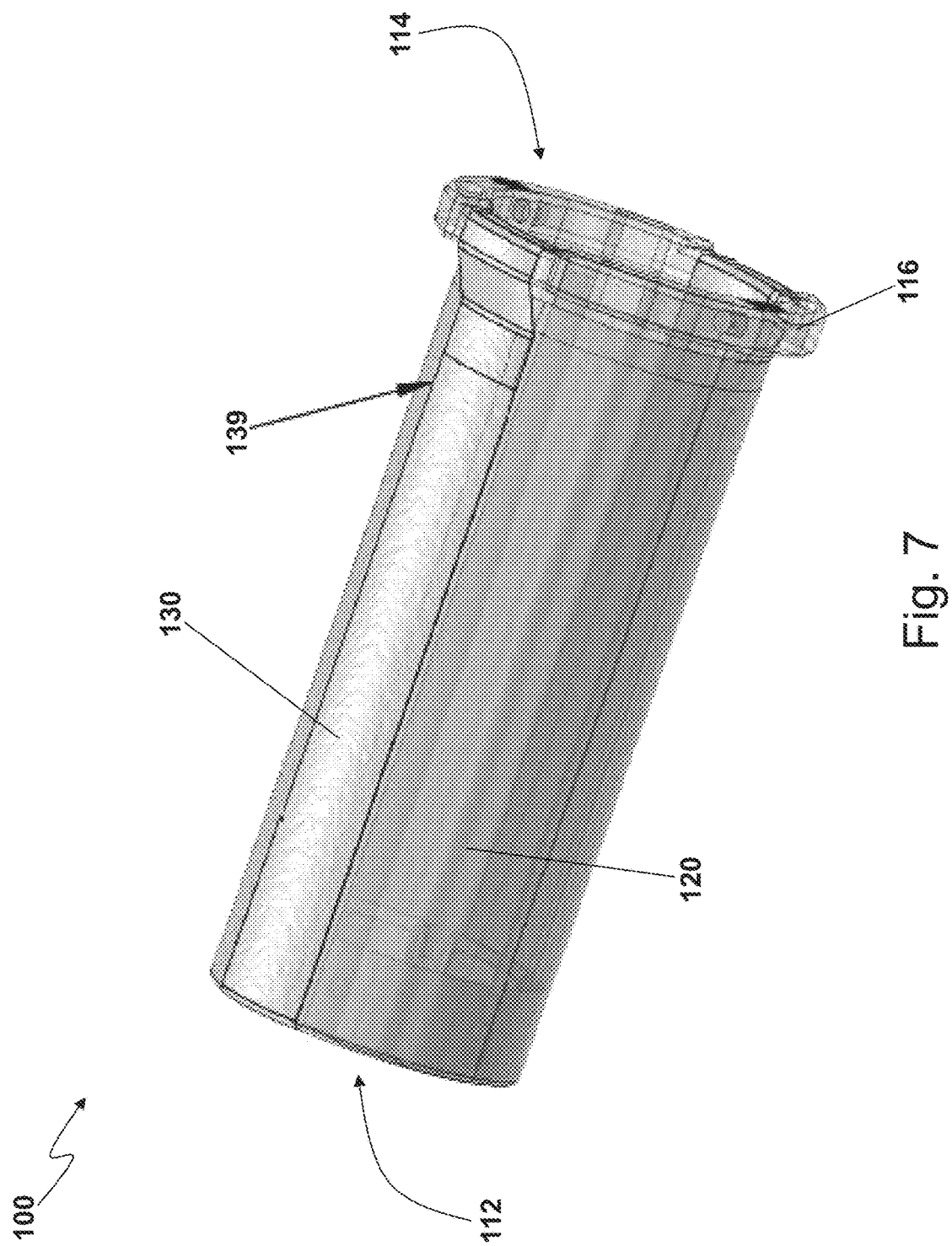
FIG. 7 is a perspective view illustrating final placement of the fixing device depicted in FIG. 1.

A tubular support core typically comprises either a solid tube body or an interlocking split tube body (e.g., a frangible body) together with a low friction film, such a Mylar®, installed over the outer surface of the tube body. The tube body provides the structural strength required to hold the device in an expanded state and can be made from any suitable material, but is typically made from plastic. The low friction film is wrapped around the outer diameter of the support tube body and is fixed to the inside of the tube body at the front end of the support core. For purposes herein, the "front end" of the support core refers to the end that extends into the device. Also, it should be understood that the term "tube" includes not only bodies with circular cross-sections but any suitable cross-sectional shape. The low friction film is not secured to the exterior surface of the tube body but rather is allowed to move freely toward the front of the core.

Tubular support cores of this type are used in, for example, the electrical industry for various cold shrinkable products. A tubular support core as described above has the disadvantage that when the cold shrinkable material covers the front end of the tube, the elastic compressional forces exerted by the cold shrinkable material places a significant amount of pressure on the front edge of the support core. The high force in this area can unintentionally cause the support core body to be ejected from the device. To prevent such ejection, adhesive tape may be wrapped radially around the back end of the support core to adhere to both an outer surface of the support core body and an outer surface of the low friction film, thus fixing the back end of the low friction film to the back end of the support core body and preventing unintentional ejection. Prior to removing the support core, a user unwinds the radially-wrapped adhesive tape, thereby freeing the low friction film to move towards the front end of the support core.

Although the conventional designs for support cores are typically effective, common failure modes include inadvertent ejection from the supported device and excessive friction which prevents intentional removal. Contributing factors may include extreme temperature exposure coupled with rough handling in transit that together can cause the support core to fail.

A need therefore exists for methods and related devices that can positively secure a support core within a cable terminating device, being held open in an expanded state, until it is intended to be installed. A need also exists for methods and related devices that facilitate the releasing of the securing mechanism of a support core such that the cable terminating device can be easily removed from the support core once ejection is desired.

With reference to FIGS. 1-4, a support core 100 according to an embodiment of the invention includes a tube body 110 having a front end region 112 and a back end region 114. Tube body 110 is designed to be disposed in a device so that front end region 112 is set deepest within the device, while back end region 114 preferably extends out of the device. Tube body 110 defines a hollow shape having an outer surface 111 and an inner surface 119. This hollow shape preferably has a circular or semi-circular cross-section across its longitudinal length, but it will be appreciated that any suitable shape may be employed for tube body 110. Tube body 110 may be made from any suitable material, such as plastic, and is constructed so that, when disposed in the device, the portion of outer surface 111 set within the device keeps the device supported in an expanded state. Back end region 114 of tube body 110 includes a flange 116. In preferred embodiments, flange 116 extends from and over outer surface 111. However, in alternative embodiments it is also possible for flange 116 to extend from inner surface 119. Flange 116 preferably extends radially around the entire circumference of tube body 110, but in alternate embodiments flange 116 may radially extend over only a portion of the circumference in a single or multiple positions, as needed.

A low friction film 120 is disposed over at least a portion of outer surface 111. Preferably, low friction film 120 is disposed over all regions of tube body 110 that are directly supporting the device to keep the device in an expanded state. Hence, in preferred embodiments, low friction film 120 radially and axially extends around the entire circumference and most of the longitudinal length of outer surface 111, from front end region 112 to back end region 114, stopping, for example, just before flange 116. Low friction film 120 preferably extends around front end region 112 to anchor onto inner surface 119. Low friction film 120 may be made from any suitable material, such as (but not limited to) polyethylene terephthalate (e.g., Mylar®). Low friction film 120 preferably has a tensile strength that is sufficiently strong to withstand pulling, without breaking, when being removed from the supported device.

To facilitate removal of not only tube body 110 from a supported device but also low friction film 120 from the supported device, low friction film 120 is preferably firmly connected by one end to tube body 110. To facilitate this connection or anchoring of low friction film 120 to tube body 110, and in particular to inner surface 119 of tube body 110, inner surface 119 can include one or more protrusions 122 that extend from inner surface 119. Protrusions 122 may be disposed, for example, in front end region 112. Low friction film 120 can include one or more corresponding openings 124 through which protrusions 122 are disposed. To further facilitate attachment of low friction film 120 to core body 110, a locking mechanism 126 may be employed to attach low friction film 120 to tube body 110. For example, locking mechanism 126 may be in the form of a ring disposed inside tube body 110 so that low friction film 120 is sandwiched between ring 126 and inner surface 119 of tube body 110. Ring 126 may include slots 128 to accommodate protrusions 122, thereby preventing openings 124 in low friction film 120 from inadvertently disengaging from protrusions 122. It will be appreciated that locking mechanism 126 may be used separately from, but is preferably used in conjunction with, protrusions 122.

Because low friction film 120 is preferably firmly attached to tube body 110, when tube body 110 is completely removed from the supported device, by continuing to pull on tube body 110, all of low friction film 120 can also be removed from the device. Hence, as noted above, low friction film 120 is preferably designed to have a tensile strength at least strong enough to withstand this additional pulling of tube body 110 to completely free low friction film 120 from the device.

As noted previously, the large compressive forces exerted by the supported device on outer surface 111 of tube body 110 (via low friction film 120) tends to push tube body 110 out of the supported device, which is facilitated by low friction film 120 sliding towards front end 112. To prevent this inadvertent sliding of low friction film 120, and thus inadvertent ejection of tube body 110 from the supported device, a fixing device 130 is used to removably anchor low friction film 120 to back end region 114 of tube body 110. Hence, in order to remove support core 100 from the supported device, fixing device 130 is first decoupled from back end region 114 such that low friction film 120 is mechanically freed from back end region 114, and can begin moving towards front end region 112, which corresponds to ejection of tube body 110 from the supported device.

In the first embodiment support core 100, fixing device 130 comprises tape that is adhered to both low friction film 120 and back end region 114 of tube body 110, thus anchoring low friction film 120 to back end region 114. In particular, adhesive tape 130 is adhered to the outer surface of low friction film 120 and preferably extends to back end region 114, over flange 116 and to inner surface 119 of tube body 110. Adhesive tape 130 thus preferably adheres to the top surface of low friction film 120, flange 116 and inner surface 119, and thus firmly anchors low friction film 120 with respect to back end region 114. Because adhesive tape 130, in the first embodiment, must rise up from outer surface 111 and/or the outer surface of low friction film 120 to cross over flange 116, a ramp 132 is formed by adhesive tape 130, which is not adhered to any surface and which thus forms a convenient cutting location to break or cut adhesive tape 130. It will be appreciated that once adhesive tape 130 is cut or broken, low friction film 120 is then decoupled from back end region 114 and is thus free to move towards front end region 112 to facilitate ejection of tube body 110. In preferred embodiments, adhesive tape 130 rises from the outer surface of low friction film 120 to cross over to flange 116 and therefore does not adhere to any portion of outer surface 111.

In the first embodiment support core 100, adhesive tape 130 forms a loop extending axially over the longitudinal length of the outer surface of low friction film 120, going over and around flange 116 to form ramp 132, and then passing through the hollow core of tube body 110, adhering to inner surface 119, to wrap around front end region 112 and adhere onto itself. For example, with reference to FIGS. 5-8, a first end 131 of adhesive tape 130 may begin at the most distal edge of front end region 112 and axially extend towards back end region 114, adhering to the outer surface of low friction film 120 along the way. In back end region 114, adhesive tape 130 extends up from low friction film 120 towards, and adheres to, the top of flange 116, forming ramp 132, and then passes around flange 116 to inner surface 119, axially extending along and adhering to the longitudinal length of inner surface 119 back to front end region 112. Adhesive tape 130 then extends around the distal end of front end region 112 to adhere back onto its outer surface, passing again to the back end region 114, with a terminal end 139 of adhesive tape 130 stopping just before ramp 132.

Figure 8:
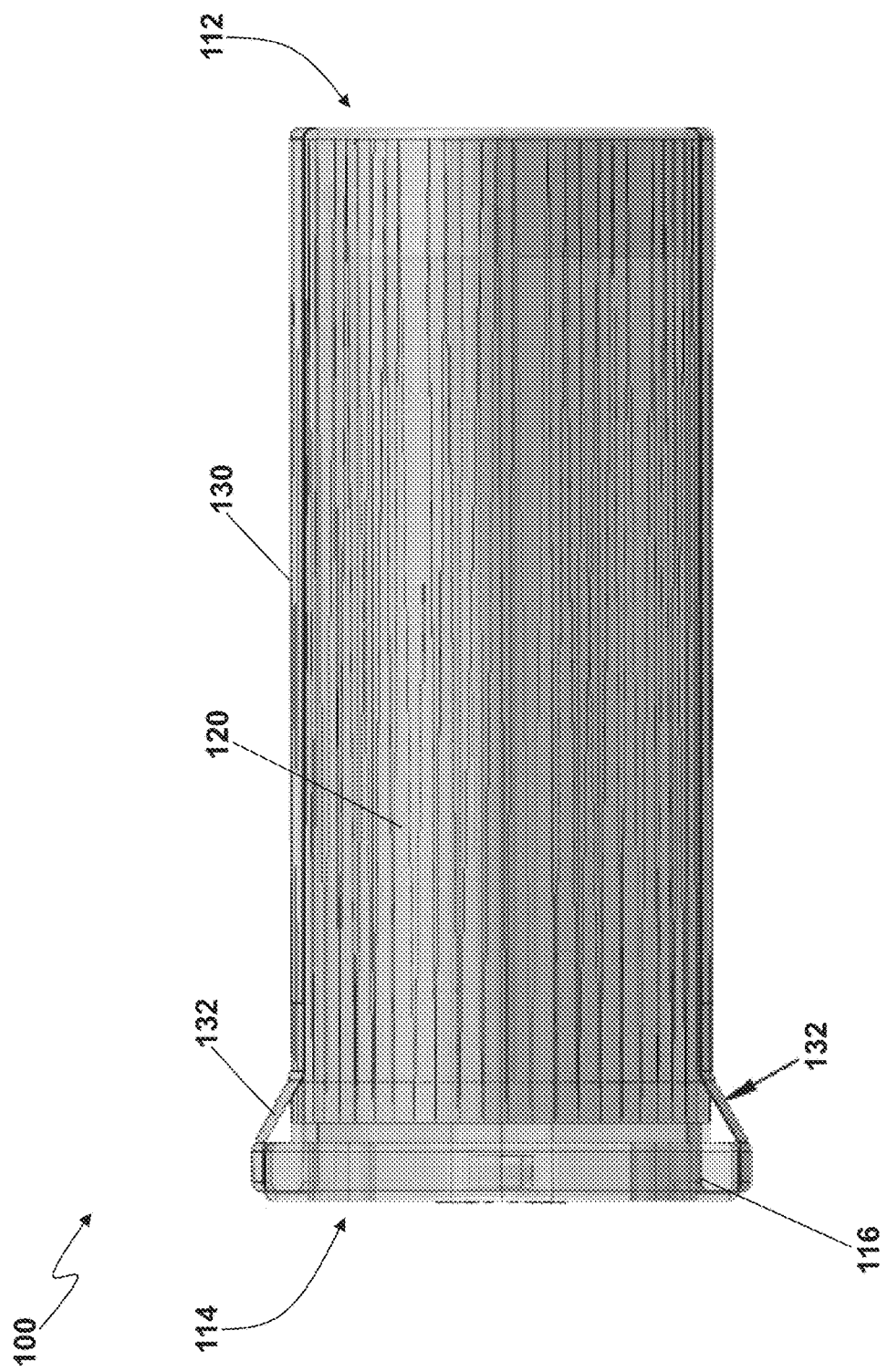
FIG. 8 is a side view illustrating final placement of the fixing device depicted in FIG. 1.
Figure 9:
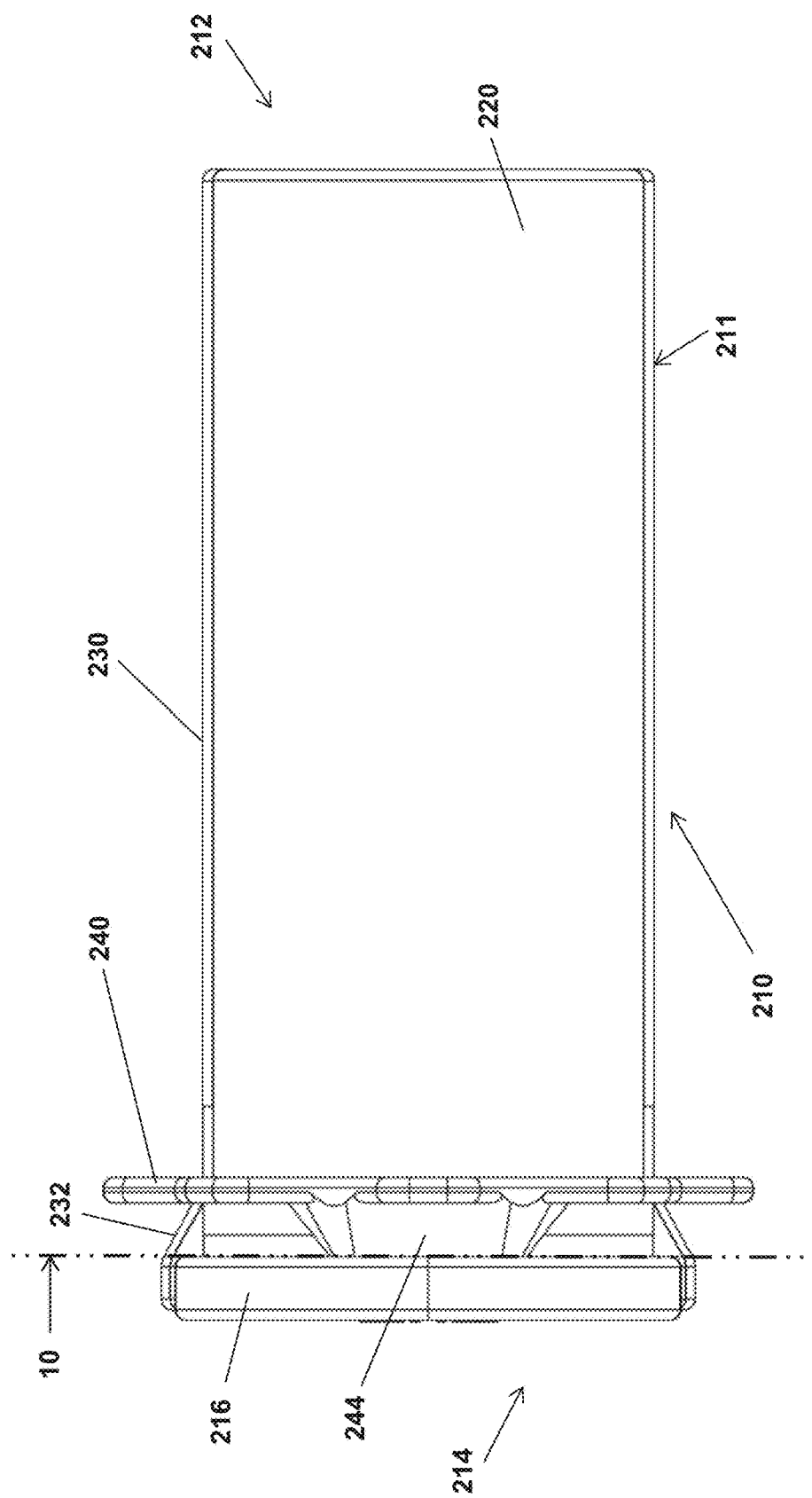
FIG. 9 is a side view of another embodiment, comprising a cutting device according to an alternative embodiment of the invention.
Figure 10:
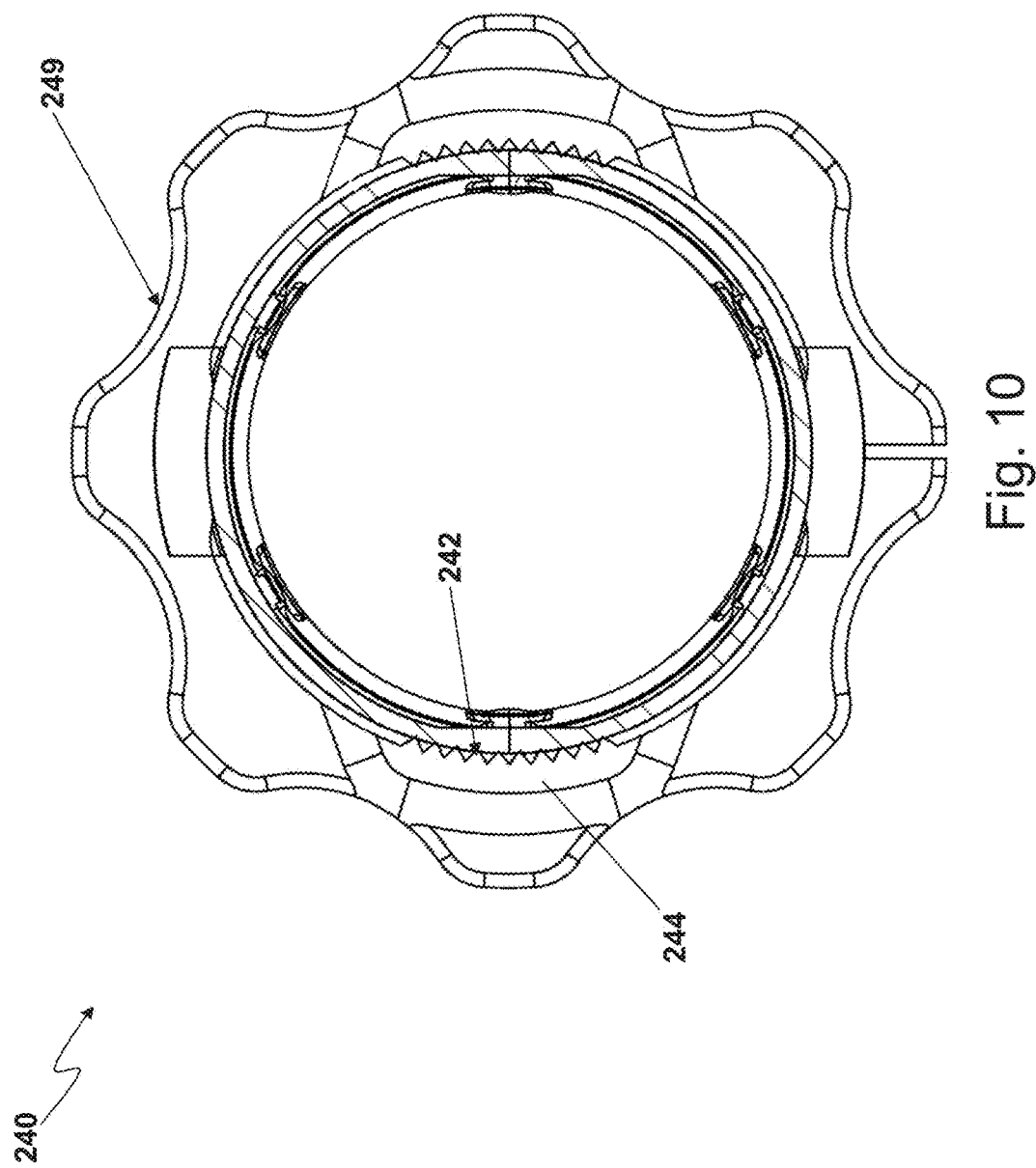
FIG. 10 is a cross-sectional view along line 10-10 in FIG. 9.
Figure 11:
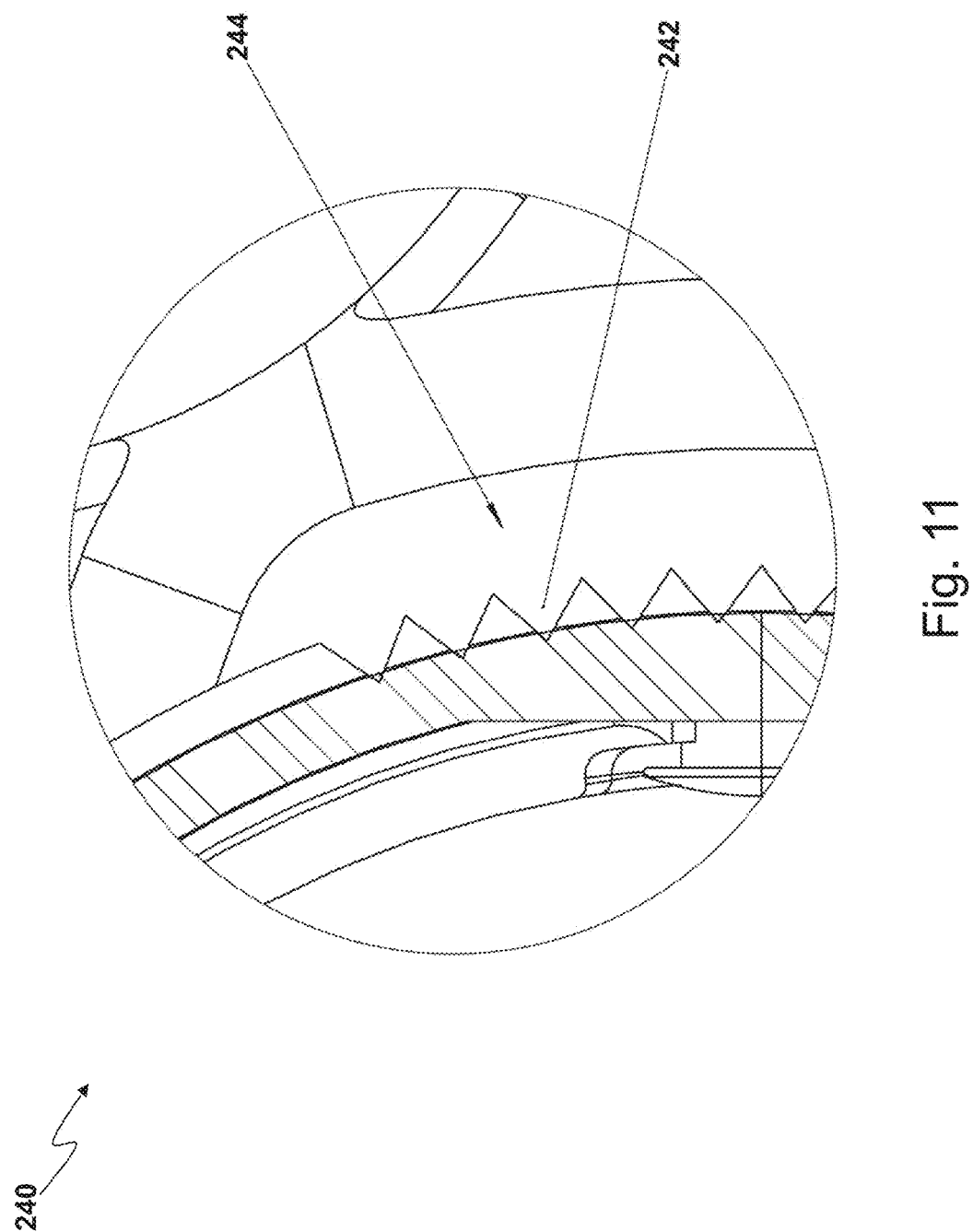
FIG. 11 is a detailed cross-sectional view of the cutting surface on the cutting device depicted in FIG. 10.
Figure 12:
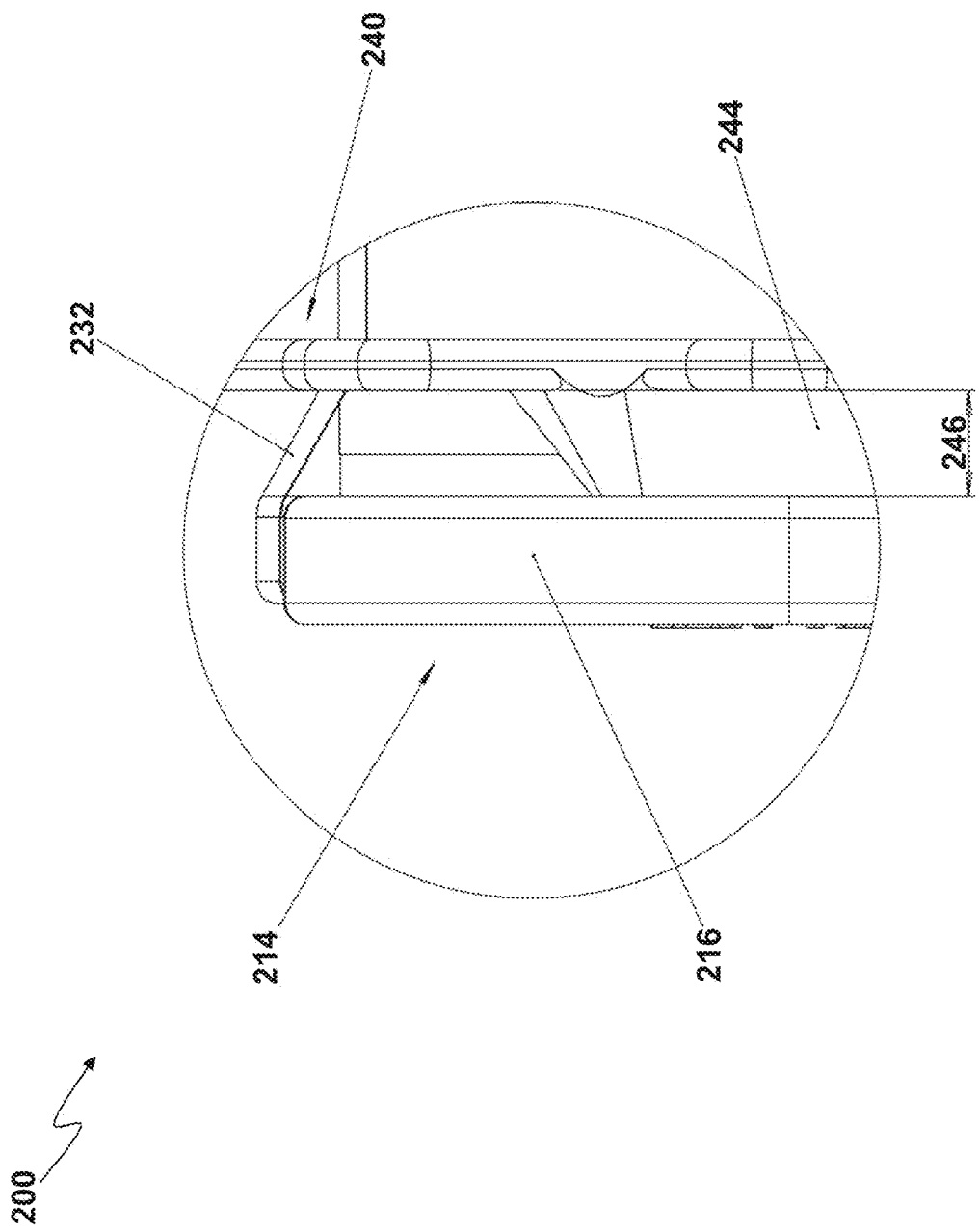
FIG. 12 is a detailed side view of a back end region of the support core depicted in FIG. 9.

As shown in FIG. 8, in the first embodiment support core 100, two strands of adhesive tape 130 are used, each spaced 180° from the other with respect to the circumference of tube body 110. Applying adhesive tape 130 as shown in the first embodiment support core 100 makes it very unlikely that tube body 110 will eject from the supported device before cutting or breaking the longitudinally wrapped tape 130 at ramp 132. It will be appreciated, however, that the exact location of adhesive tape 130 around tube body 110 circumference, the quantity (e.g., length), and method of installation of adhesive tape 130 may vary while still achieving the same outcome of fixing or anchoring low friction film 120 with respect to back end region 114.

As previously indicated, ramp 132 provides a convenient location to cut or break adhesive tape 130, and thus decouple low friction film 120 from back end region 114 so that low friction film 120 can slide towards front end region 112. Any suitable device may be used to cut or break adhesive tape 130, such as a knife or the like. However, in the first embodiment, a cutting device 140 is provided to facilitate the cutting of adhesive tape 130 in ramp 132. Cutting device 140 can be in the form of a ring disposed around tube body 110, low friction film 120 and adhesive tape 130. Ring 140 is preferably slidable along the longitudinal length of tube body 110, and is also preferably rotatable around the circumference of tube body 110. Ring 140 includes a cutting surface 142 in the form of, for example, a tooth, although other cutting surfaces, such as blade or the like, are certainly possible. When tooth 142 is rotated into radial position with respect to ramp 132, and then urged longitudinally toward flange 116, tooth 142 pierces adhesive tape 130 in ramp 132, thus forming a tear that finally extends across the width of ramp 132, severing adhesive tape 130 and thus freeing low friction film 120 to move towards front end region 112. Ring 140 may also be rotated while tooth 142 is pressing against ramp 132, thus further assisting in the cutting of adhesive tape 130. Thereafter, flange 116 may be grasped so as to pull tube body 110 from the supported device. Once front end region 112 of tube body has exited the device, low friction film 120, which slides over tube body 110 towards front end region 112, may be left behind in the supported device, likely sandwiched between the device and another component upon which the device has contracted. By continuing to pull on tube body 110, the remainder of low friction film 120 can be fully removed from the device, thus completing the removal of support core 100.

With reference to FIGS. 9-13, a second embodiment support core 200 is depicted, which may differ from the first embodiment support core 100 primarily in the form of cutting device 240. Hence, analogous to support core 100, support core 200 includes a tube body 210 having a front end region 212 and a back end region 214. Back end region 214 includes a flange 216. A low friction film 220 is disposed over at least a portion of the outer surface of tube body 210, and may be anchored to tube body 210 in a manner similar to that used in embodiment 100. Fixing device 230, which may be in the form of adhesive tape, is used to further removably anchor low friction film 220 to back end region 214 of tube body 210, and forms a ramp 232 with flange 216, similar to fixing device 130 of the first embodiment support core 100. Hence, in order to remove support core 200 from a supported device, fixing device 230 is first decoupled from back end region 214, such as by breaking the adhesive tape at ramp 232, so that low friction film 220 can begin moving towards front end region 212.

Cutting device 240 is in the form of a ring disposed around tube body 210, low friction film 220 and adhesive tape 230. Ring 240 is preferably slidable along the longitudinal length of tube body 210, and is also preferably rotatable around the circumference of tube body 210. Ring 240 includes a longitudinal offset boss 244, the internal surface of which includes a cutting surface 242 in the form of, for example, one or more teeth. Offset boss 244 is designed to abut flange 216, thereby creating a longitudinal gap 246 between flange 216 and a radial surface of ring 240. In particular, the radial surface of ring 240 can include finger grips 249. A user grips finger grips 249 to rotate ring 240, bringing cutting surface 242 of boss 244 into contact with ramp 232 to pierce, cut or both adhesive tape 230, thus freeing low friction film 220 to move towards front end region 212. Thereafter, flange 216, or finger grips 249, may be grasped by the user so as to pull tube body 210 and low friction film 220 from the supported device.

Offset boss 244 can ensure that a consistent space 246 exists between ring 240 and flange 216, and can also ensure that cutting surface 242 is positioned at a location, with respect to ramp 232, that will more reliably cut adhesive tape 230. Offset boss 244 can also create frictional interference between ring 240 and core body 210 that prevents ring 240 from rotating freely, thus avoiding inadvertent cutting of adhesive tape 230 by cutting surface 242. It will be appreciated, however, that other methods, such as an additional piece of tape, a zip tie, or other method, of rotationally indexing ring 240 to core body 210 can also be used. It will be further appreciated that space 246 provided by offset boss 244 can vary in size according to the specific use, so as to provide a consistent offset 246 to allow either removal by hand, with a core removal tool, or other method.

Figure 14A:
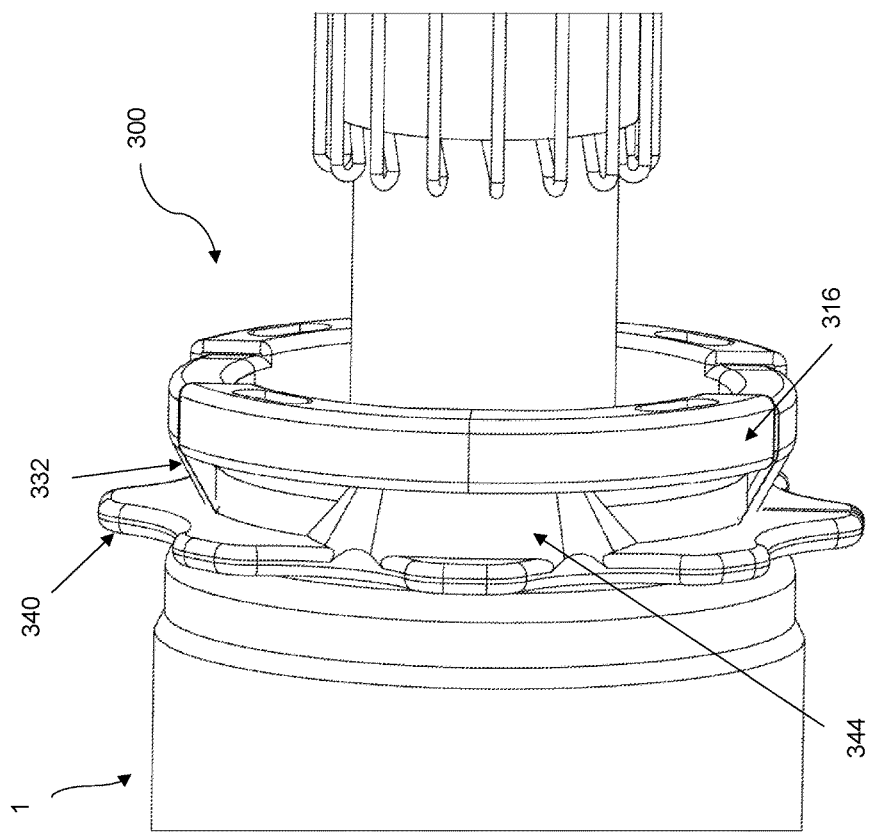
Figure 14B:
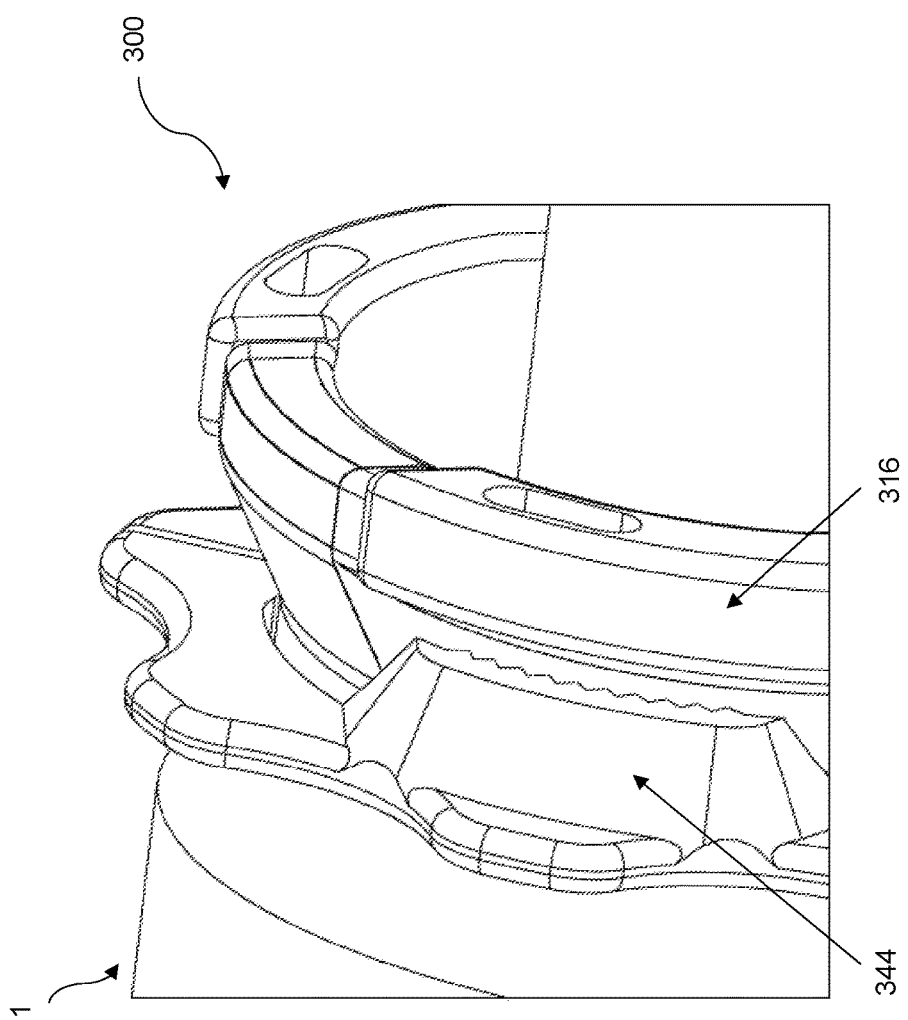
Figure 14D:
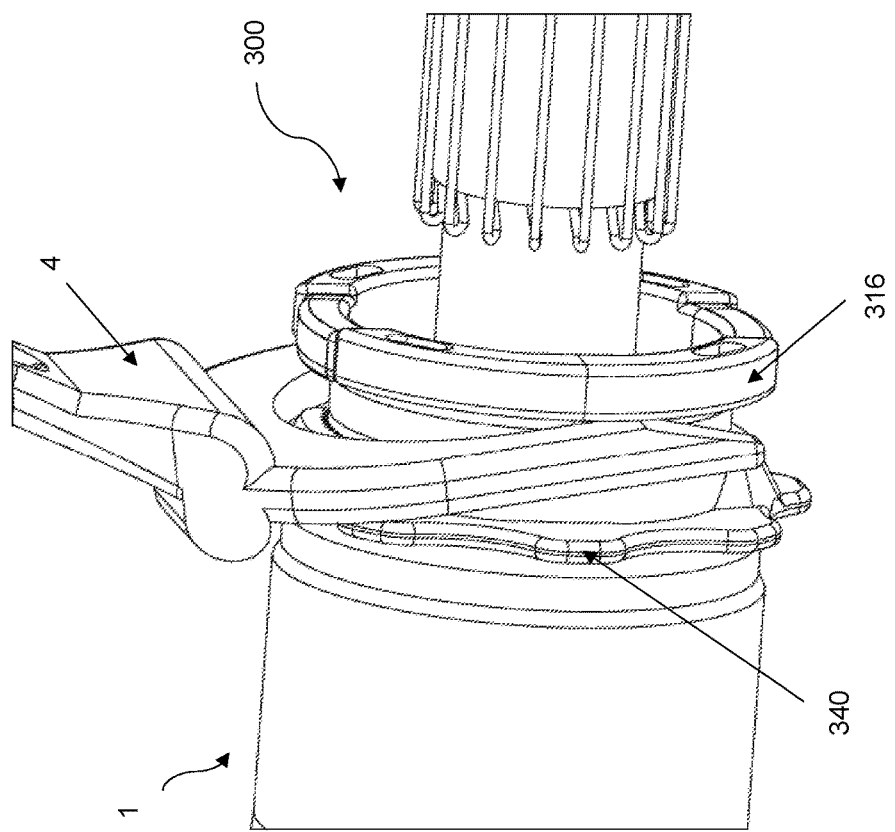
Figure 14E:
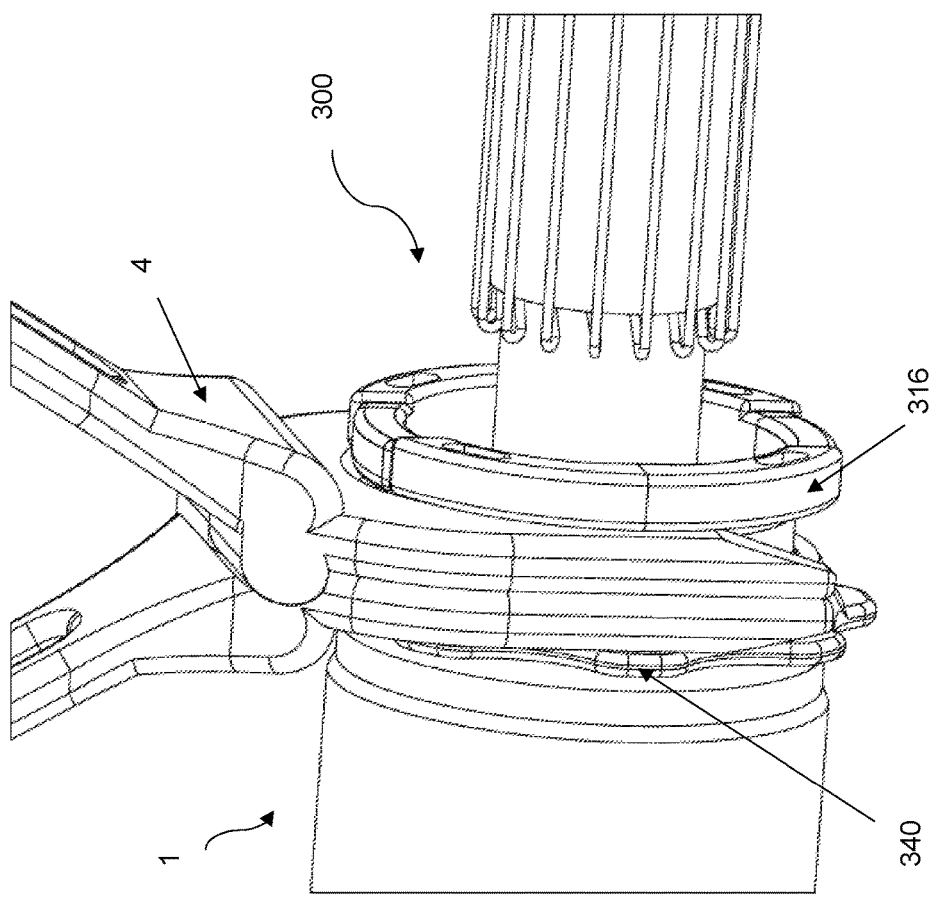
Figure 14F:
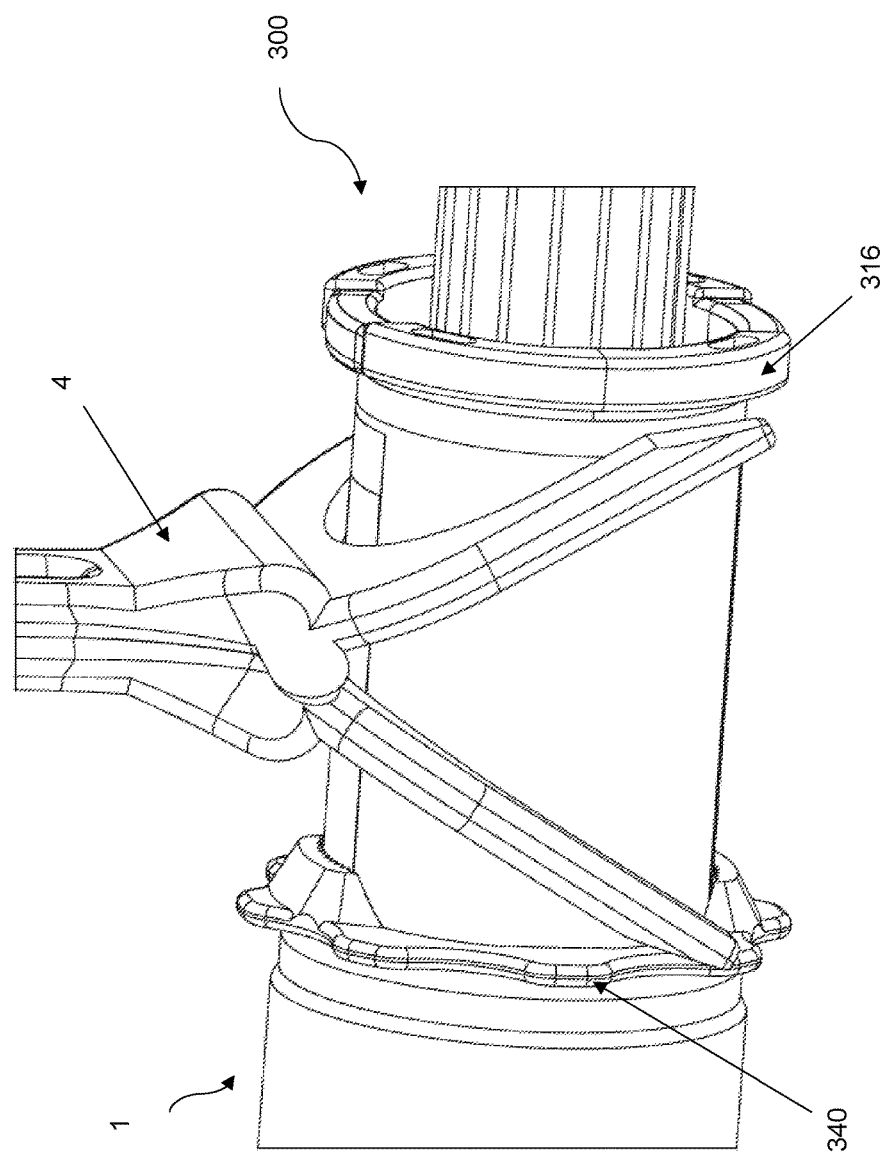
Figure 14G:
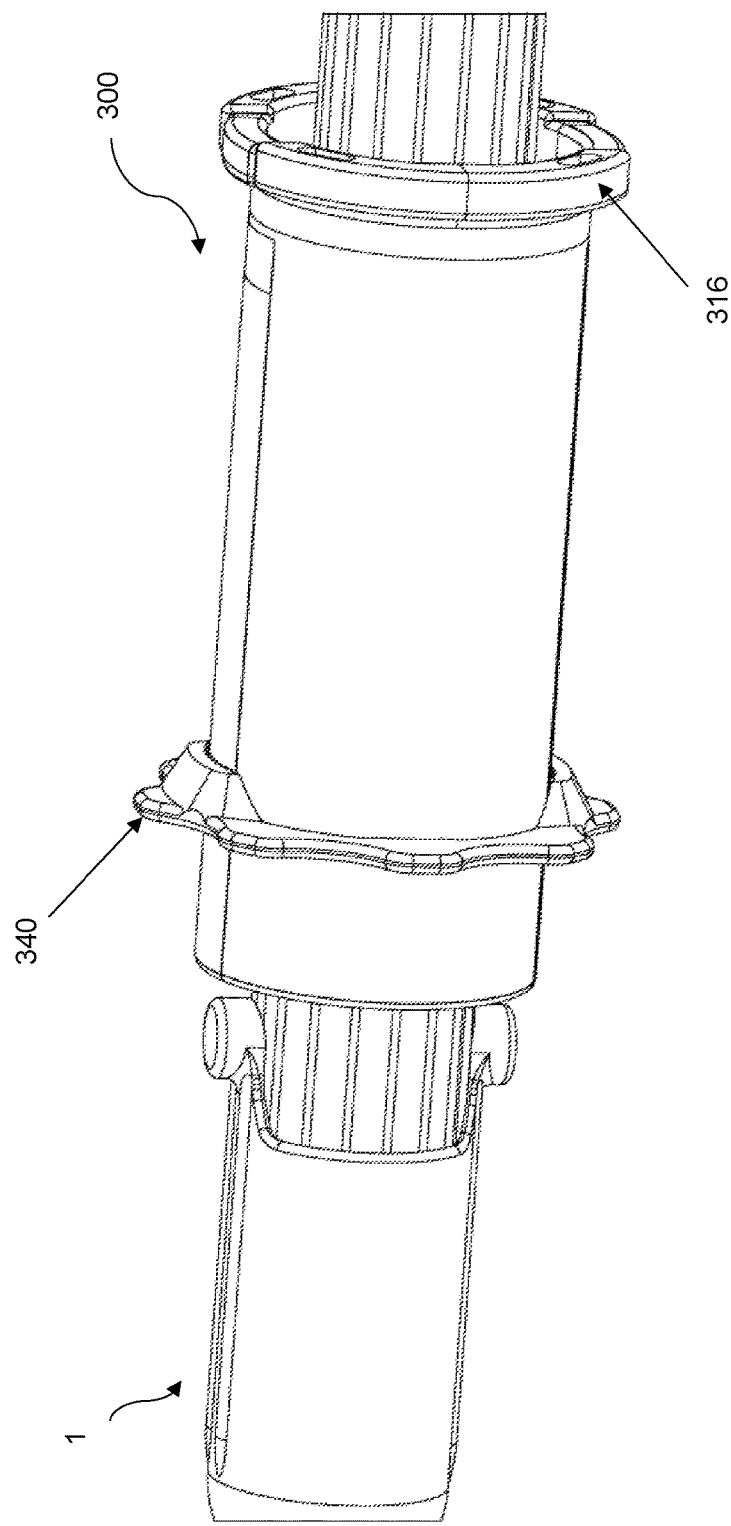

FIGS. 14A-14G illustrate core removal according to an embodiment of the invention. As shown in FIG. 14A, an embodiment support core 300 includes a cutting device 340 and is used to hold a device 1, such as a splice, in an expanded state. To remove support core 300 from device 1, a user initially grabs cutting device 340 and pushes cutting device 340 against flange 316. The user then twists cutting device 340 so that teeth on offset boss 344 cut tape at ramp 332, as shown in FIG. 14B. If, as shown in FIG. 14C, a core removal tool 4 is used, then one half of core removal tool 4 can be inserted between cutting device 340 and flange 316. In such embodiments, offset boss 344 can also be configured to interlock with core removal tool 4 so as to make it easier to twist cutting device 340 in the preceding step. As shown in FIG. 14D, this half of tool 4 can also be used to pry support core 300 away from (e.g., out of) device 1. As shown in FIG. 14E, the second half of core removal tool 4 can then be inserted between cutting device 340 and flange 316. As shown in FIG. 14F, the handles of core removal tool 4 are pressed together to further eject core 300 from device 1. Finally, as illustrated in FIG. 14G, the remainder of support core 300 is removed from device 1 by hand, such as by pulling on flange 316. Preferably, when removing support core 300, core 300 is not twisted but is instead pulled axially from device 1 without rotation. Of course, it will be appreciated that core removal tool 4 need not be used, and instead the user can, after cutting the tape at ramp 332, simply grasp flange 316 to pull support core 300 from device 1.

Figure 15A:
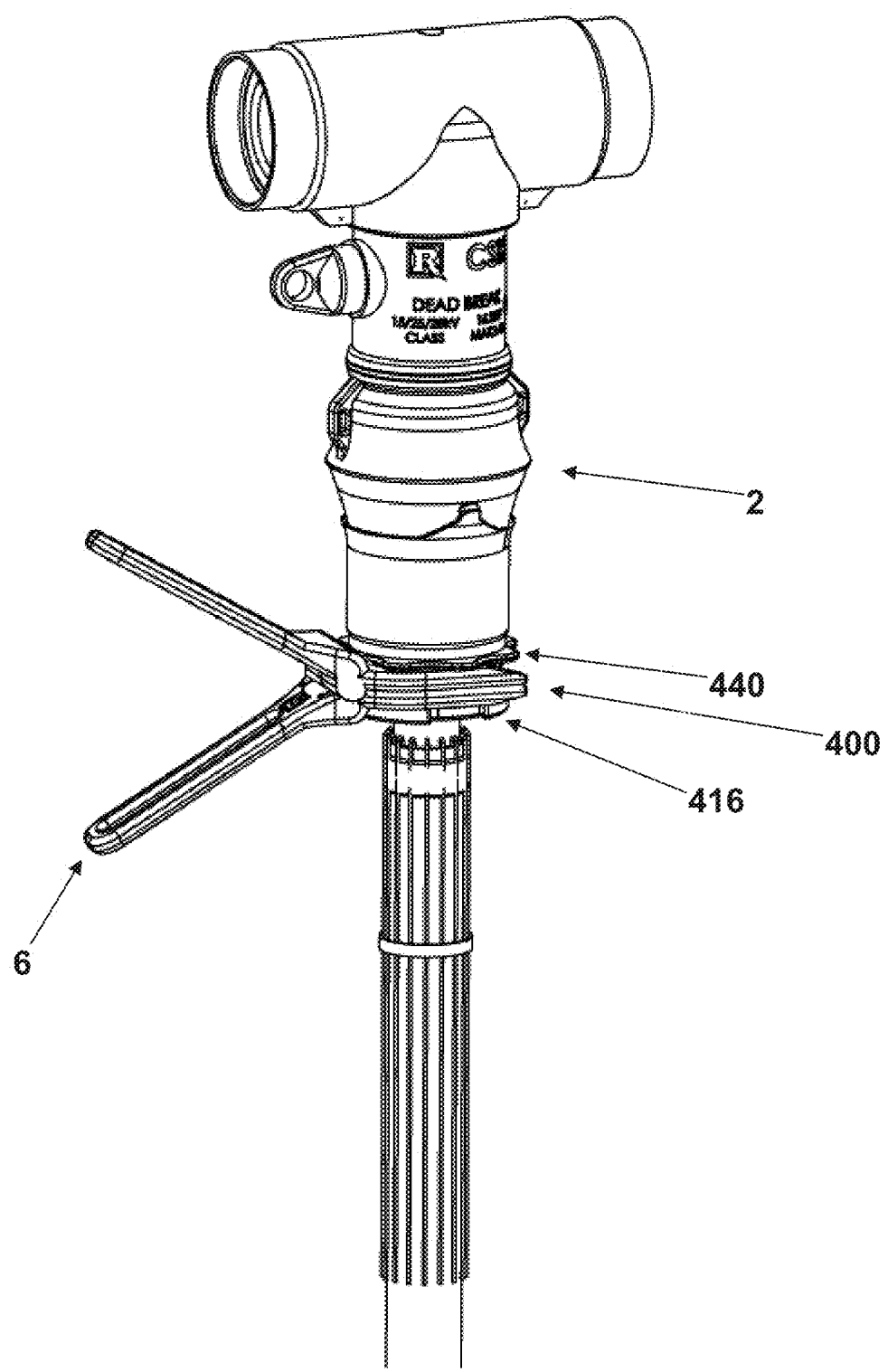
FIGS. 15A-15C illustrate core removal according to another embodiment of the invention.
Figure 15B:
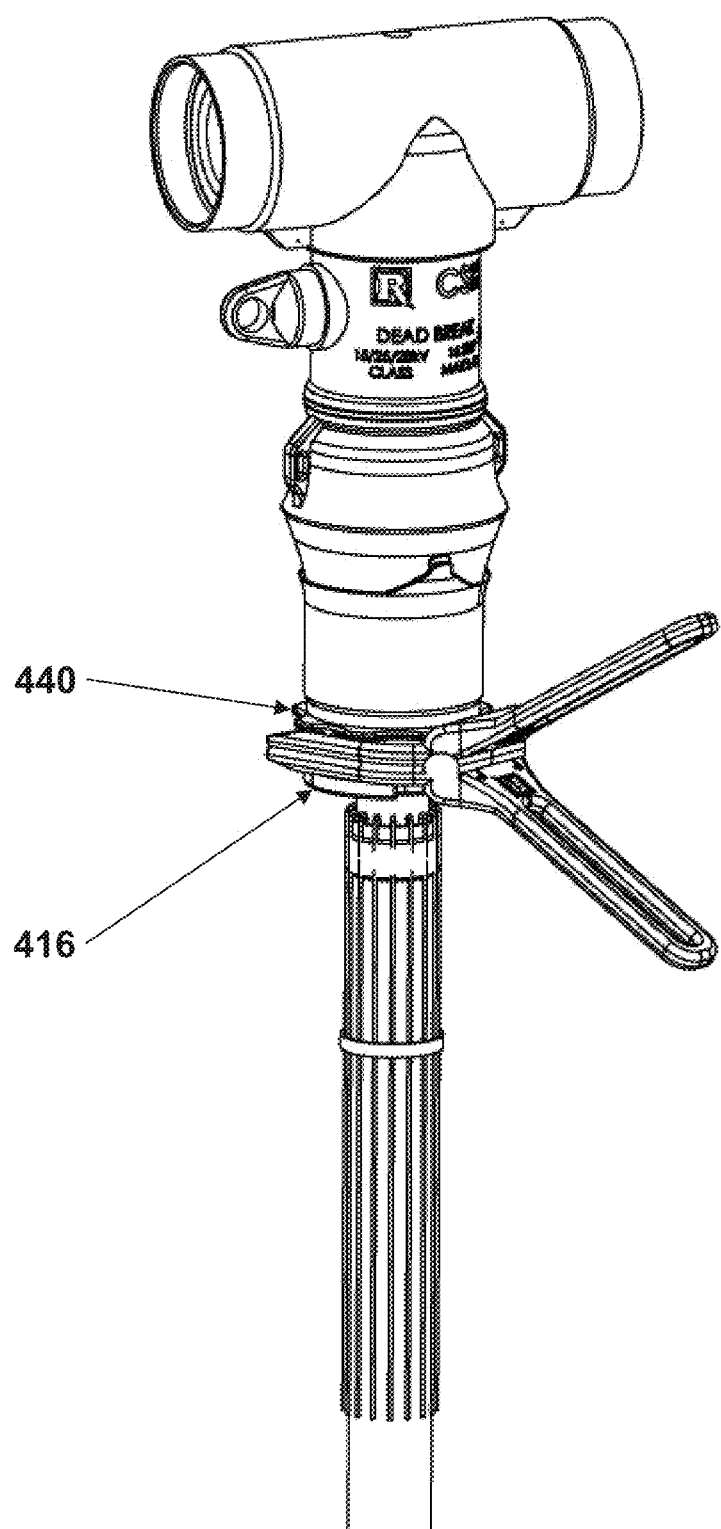
Figure 15C:
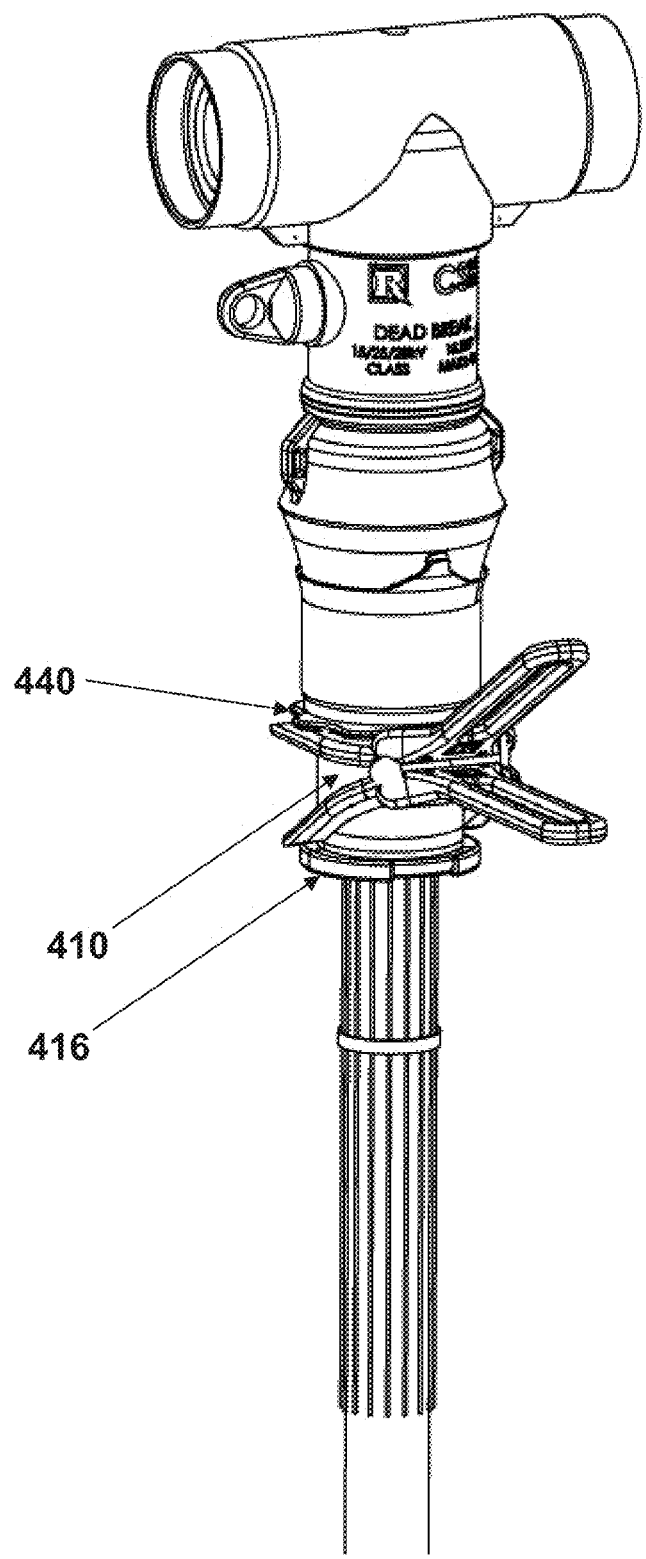

FIGS. 15A-15C illustrate core removal according to yet another embodiment of the invention. As shown in the figures, an embodiment support core 400 is initially in place to hold a device 2 in an expanded state, such as a T-splice. A removal tool 6 is used to remove support core 400 from device 2. As illustrated in FIG. 15A, removal tool 6 is first placed onto support core 400 and interlocks with cutting device 440 of support core 400. For example, cutting device 440 of support core 400 may include a recess or shape that interlocks with a corresponding protrusion or shape on removal tool 6. As illustrated in FIG. 15B, tool 6 is then rotated, which causes corresponding rotation of interlocked cutting device 440, which thus cuts the tape on support core 400. Then, as shown in FIG. 15C, the handles of tool 6 are pressed together, which in turn pushes cutting device 440 away from flange 416 of support core 400, thus pushing tube body 410 of support core 400 out of device 2. The remainder of support core 400 may then be removed from device 2 by hand, such as by pulling on flange 416.

With reference to FIG. 16, a third embodiment support core 500 is depicted, which may differ from support core 100 and support core 200 primarily in the form of the back end region 514. Support core 500 is a flangeless core, which lacks, for example, the flange 116 (and therefore also the ramp 132) of support core 100. A low friction film 520 is disposed over at least a portion of the outer surface of the tube body, and may be anchored to the tube body in a manner similar to support core 100. Fixing device 530, which may be in the form of a tape, is used to removably anchor low friction film 520 to back end region 514 of the tube body of support core 500. The tape 530 is wrapped around the core along its length (circling back through the tube body as indicated at 580), similar to tape 130 of support core 100 as shown in FIGS. 5-8, but without flange 116 and ramp 132 since back end region 514 of support core 500 is flangeless. At least one portion of tape 530 is secured to another portion of tape 530 to form a loop. In order to remove support core 500 from a supported device, fixing device 530 is first decoupled from back end region 514, such as by breaking the tape 530 at a cut line 550 in a cutting region 560, so that low friction film 520 can begin moving away from back end region 514 towards the front end region of the tube body.

In some embodiments, as shown in FIG. 16, support core 500 may include a cutting device such as, but not limited to, cutting device 540, which is substantially similar to cutting device 240 of support core 200 as shown in FIGS. 9-13. Cutting device 540 is in the form of a ring disposed around the tube body of core 500, low friction film 520 and tape 530. Ring 540 is preferably slidable along the longitudinal length of the tube body, and is also preferably rotatable around the circumference of tube body. Ring 540 may include a longitudinal offset boss 544, the internal surface of which may support a cutting surface 542 in the form of, for example, one or more cutting teeth, a blade or knife edge, or other suitable cutting surface. The radial surface of ring 540 can include finger grips 549. A user can grip the finger grips 549 to rotate ring 540, bringing cutting surface 542 into contact with tape 530 to pierce, cut or both tape 530 (or both tape 530 and film 520), thus freeing low friction film 520 to move away from back end region 514 towards the front end region. Thereafter, the finger grips 549, or back end region 514, may be grasped by the user so as to pull the tube body and low friction film 520 from the supported device. In other embodiments, support core 500 may be provided and installed without a cutting device, and fixing device 530 can be cut, for example, with a knife or other means.

Although fixing device 130 and fixing device 230 are described above as comprising adhesive tape, fixing device 130 and fixing device 230 need not be adhesive, and in alternative embodiments fixing device 130 and fixing device 230 can comprise a non-adhesive tape. Those skilled in the art will recognize that, in certain embodiments, all or some of the surface of tape 130, tape 230, and/or tape 530 may be adhesive or welded to the tube body of the support core; however, in some embodiments there may be no adhesion of the fixing device to the support core at all. Adhesion/bonding of the tape to the outer surface of the low friction film/inner surface of the core (around which it is wrapped as described above in connection with support core 100) is not required to secure the support core within a device. For example, in some embodiments, the tape may be wrapped around the core and secured to itself to form a tight loop without being affixed to the tube body in any way, the tensile strength of the tape being sufficient to prevent movement of the low friction film until the tape is cut.

Figure 17:
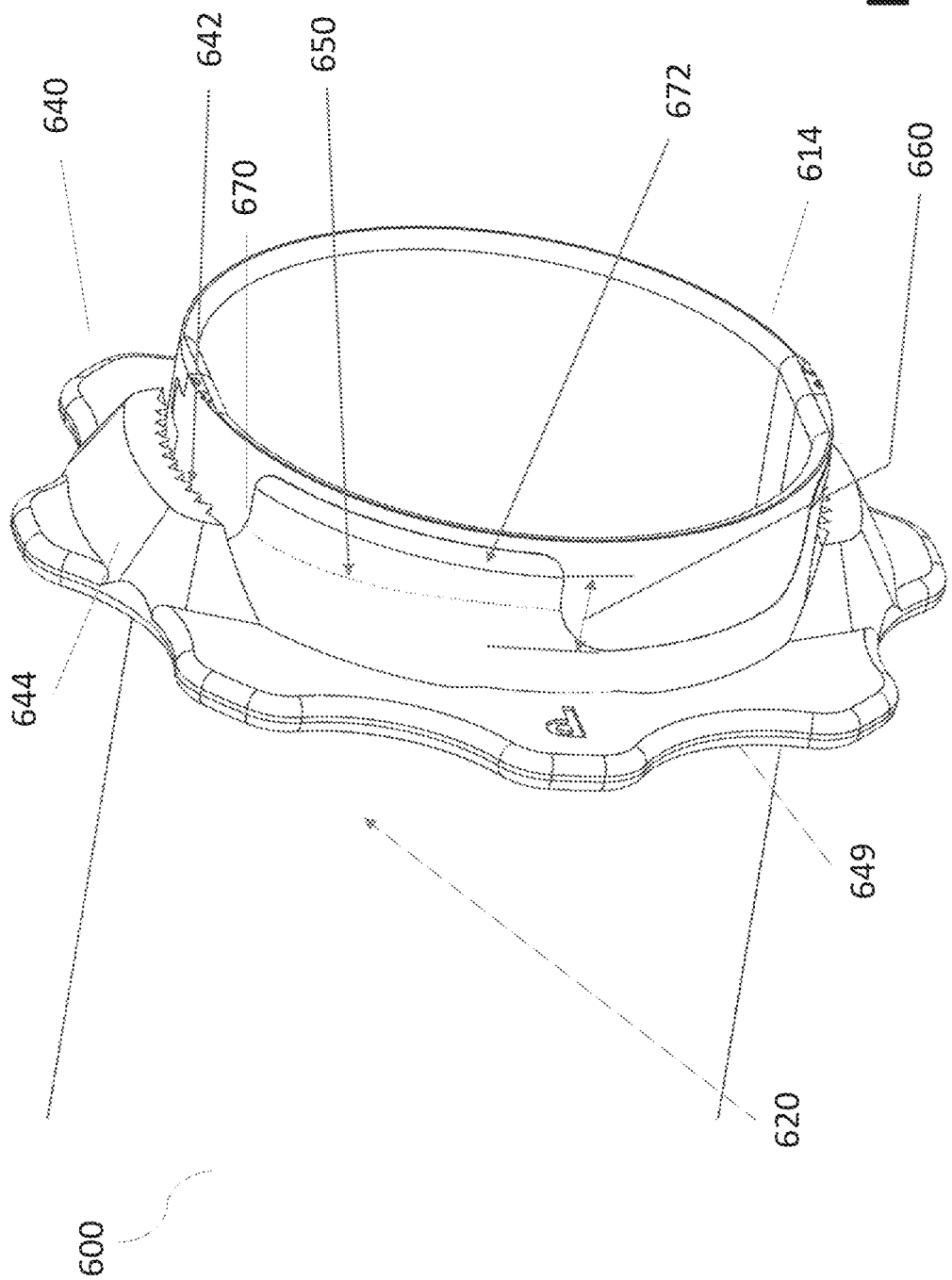
FIG. 17 is a perspective view of a flangeless support core having a low friction film with an integral tab section as the fixing device, according to another embodiment of the invention.

With reference to FIG. 17, a fourth embodiment support core 600 is depicted, which may differ from support core 500 primarily in the form of low friction film 620. Support core 600 may be a flangeless core, which like support core 500 lacks, for example, the flange 116 (and therefore also the ramp 132) of support core 100. A low friction film 620 is disposed over at least a portion of the outer surface of the tube body, and may be anchored to the tube body in a manner similar to support core 100. However, instead of a tape, support core 600 includes a fixing device in the form of one or more tabs 670, which anchor low friction film 620 to back end region 614 of the tube body of support core 600. Specifically, in support core 600, low friction film 620 comprises at least one tab portion 670 integral to the main body of the film 620. Tab region 670 includes a bonding region 672, at which the tab has adhesive or is welded or otherwise secured to the core at the back region 614 of the tube body. In order to remove support core 600 from a supported device, low friction film 620 is cut at a cut line 650 in a cutting region 660 of tab portion 670 below the bonding region 672, so that low friction film 620 is decoupled from back end region 614 and can begin moving away from back end region 614 towards the front end region of the tube body. In some embodiments, two tabs 670 may be used, each spaced 180° from the other with respect to the circumference of the tube body. In other embodiments, different numbers and/or arrangements of tabs may be used.

In some embodiments, as shown in FIG. 17, support core 600 may include a cutting device such as, but not limited to, cutting device 640, which is substantially similar to cutting device 240 of support core 200 as shown in FIGS. 9-13. Cutting device 640 is in the form of a ring disposed around the tube body of core 600 and low friction film 620. Ring 640 is preferably slidable along the longitudinal length of the tube body, and is also preferably rotatable around the circumference of tube body. Ring 640 may include a longitudinal offset boss 644, the internal surface of which may support a cutting surface 642 in the form of, for example, one or more cutting teeth, a blade or knife edge, or other suitable cutting surface. The radial surface of ring 640 can include finger grips 649. A user can grip the finger grips 649 to rotate ring 640, bringing cutting surface 642 into contact with tab(s) 670 of film 620 to pierce, cut or both film 620, thus freeing low friction film 620 to move away from back end region 614 towards the front end region. Thereafter, the finger grips 649, or back end region 614, may be grasped by the user so as to pull the tube body and low friction film 620 from the supported device. In other embodiments, support core 600 may be provided and installed without a cutting device, and film 620 can be cut at tab region 670, for example, with a knife or other means.

Those skilled in the art will recognize that the present invention has many applications, may be implemented in various manners and, as such is not to be limited by the foregoing embodiments and examples. Any number of the features of the different embodiments described herein may be combined into a single embodiment, the locations of particular elements can be altered and alternate embodiments having fewer than or more than all of the features herein described are possible. Functionality may also be, in whole or in part, distributed among multiple components, in manners now known or to become known.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention. While there has been shown and described fundamental features of the invention as applied to being exemplary embodiments thereof, it will be understood that omissions and substitutions and changes in the form and details of the disclosed invention may be made by those skilled in the art without departing from the spirit of the invention. Moreover, the scope of the present invention covers conventionally known, future developed variations and modifications to the components described herein as would be understood by those skilled in the art.

What is claimed is:

1. A support core comprising:
   a tube body comprising an outer surface and an inner surface, the tube body configured to hold an elastic end of a device in an expanded state;
   a film disposed over at least a portion of the outer surface of the tube body, the film configured to slide over the at least a portion of the outer surface of the tube body; and
   a fixing device configured to prevent the film from sliding towards a front end region of the tube body, the fixing device comprising a tape wrapped longitudinally over the film and through the tube body, at least one portion of the tape secured to another portion of the tape to form a loop.

2. The support core of claim 1, further comprising a cutting device configured to cut the fixing device.

3. The support core of claim 1, wherein a back end region of the tube body comprises a flange extending from and over the outer surface of the tube body, and the tape forms a ramp where it passes over the flange.

4. The support core of claim 3, wherein the flange extends around a complete circumference of the tube body.

5. The support core of claim 1, wherein the tape comprises an adhesive tape adhered to a top surface of the film and the inner surface of the tube body.

6. The support core of claim 1, wherein at least one portion of the tape is welded to the film or the tube body.

7. The support core of claim 2, wherein the cutting device comprises a ring slidable longitudinally along the outside surface of the tube body, the ring comprising a cutting surface.

8. The support core of claim 7, wherein the cutting surface comprises one or more teeth.

9. The support core of claim 7, wherein the cutting surface comprises a knife edge.

10. The support core of claim 7, wherein the ring comprises a radial surface and a longitudinal offset boss, wherein the cutting surface is disposed on an internal surface of the longitudinal offset boss.

11. The support core of claim 10, wherein the radial surface comprises one or more finger grips.

12. The support core of claim 1, wherein the film is further disposed over at least a portion of the inner surface of the tube body and attached to the inner surface.

13. The support core of claim 12, wherein the inner surface of the tube body comprises at least one protrusion, and the film comprises at least one opening engaged with the protrusion.

14. The support core of claim 13, further comprising a locking mechanism engaged with the film to prevent the at least one opening of the film from disengaging from the at least one protrusion.

15. The support core of claim 14, wherein the locking mechanism comprises a locking ring disposed inside the tube body, the film sandwiched between the inner surface of the tube body and the locking ring.

16. A method for deploying a support core, at least a portion of the support core disposed in a device, the support core comprising:
   a tube body comprising an outer surface and an inner surface, at least a first portion of the outer surface configured to support a device in an expanded state;
   a film disposed over at least a second portion of the outer surface, the film configured to slide over the second portion of the outer surface; and
   a fixing device configured to prevent the film from sliding towards a front end region of the tube body, the fixing device comprising (i) a tape wrapped longitudinally over the film and through the tube body, at least one portion of the tape secured to another portion of the tape to form a loop, or (ii) a tab region comprising an integral portion of the film, the tab region including a bonding region where the film is fixed to a back end region of the tube body,
   wherein the method comprises:
      cutting or breaking the fixing device so that the film can slide towards the front end region of the tube body.

17. The method of claim 16, wherein the back end region comprises a flange disposed on the outer surface of the tube body, and wherein the method further comprises:
   utilizing the flange to pull the tube body out of the device.

18. A support core comprising:
   a tube body comprising an outer surface and an inner surface, the tube body configured to hold an elastic end of a device in an expanded state;
   a film disposed over at least a portion of the outer surface of the tube body, the film configured to slide over the at least a portion of the outer surface of the tube body; and
   a fixing device configured to prevent the film from sliding towards a front end region of the tube body, the fixing device comprising a tab region integral to the film, the tab region including a bonding region where the tab region is secured to a back end region of the tube body.

19. The support core of claim 18, further comprising a cutting device configured to cut the tab region.

20. The support core of claim 18, wherein the film is further disposed over at least a portion of the inner surface of the tube body and attached to the inner surface.

* * * * *